(12) United States Patent
Campbell et al.

(10) Patent No.: US 6,240,451 B1
(45) Date of Patent: *May 29, 2001

(54) METHOD AND APPARATUS FOR AUTOMATICALLY DISSEMINATING INFORMATION OVER A NETWORK

(75) Inventors: R. David L. Campbell; Roland Faragher-Horwell, both of Seattle, WA (US)

(73) Assignee: Punch Networks Corporation, Seattle, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/969,135

(22) Filed: Nov. 12, 1997

Related U.S. Application Data

(63) Continuation-in-part of application No. 08/452,596, filed on May 25, 1995, now Pat. No. 5,694,596.

(51) Int. Cl.[7] .......................... G06F 15/173; G06F 15/16
(52) U.S. Cl. ............................................ 709/224; 709/248
(58) Field of Search .................................. 709/217, 220, 709/221, 224, 248, 238; 707/10, 203, 201, 511, 8; 345/330, 331, 332; 395/712

(56) References Cited

U.S. PATENT DOCUMENTS

| | | | | |
|---|---|---|---|---|
| 4,466,060 | * | 8/1984 | Riddle | 364/200 |
| 4,644,532 | * | 2/1987 | George et al. | 370/255 |
| 5,079,767 | * | 1/1992 | Perlman | 370/94.3 |
| 5,293,376 | * | 3/1994 | White | 370/258 |
| 5,359,730 | * | 10/1994 | Marron | 395/712 |
| 5,379,429 | * | 1/1995 | Hirasawa et al. | 395/712 |
| 5,421,015 | * | 5/1995 | Khoyi et al. | 709/107 |
| 5,459,725 | * | 10/1995 | Bodner et al. | 370/390 |
| 5,473,772 | * | 12/1995 | Halliwell et al. | 395/712 |
| 5,499,365 | * | 3/1996 | Anderson et al. | 707/203 |
| 5,535,195 | * | 7/1996 | Lee | 370/256 |
| 5,551,048 | * | 8/1996 | Steely, Jr. | 707/201 |
| 5,586,304 | * | 12/1996 | Stupek, Jr. et al. | 395/712 |
| 5,608,649 | * | 3/1997 | Gopinath et al. | 709/242 |
| 5,630,066 | * | 5/1997 | Gosling | 709/221 |
| 5,649,200 | * | 7/1997 | Leblang et al. | 395/703 |
| 5,675,802 | * | 10/1997 | Allen et al. | 395/703 |
| 5,905,984 | * | 5/1999 | Thorsen | 707/9 |

* cited by examiner

Primary Examiner—Zarni Maung
Assistant Examiner—Jason D. Cardone
(74) Attorney, Agent, or Firm—Christensen O'Connor Johnson Kindness PLLC

(57) ABSTRACT

An information distribution program (36) is provided for automatically distributing information over a network (24) connecting a plurality of computers (15). Each computer (15) is installed with the information distribution program (36), which comprises a family construction module (44), a publication module (40), a subscription module (42), and an information tree (46). The information tree (46) stores the most recent information available to the computer (15). The family construction module (44) organizes the various computers (15) connected to the network (24) into immediate and extended families of related computers (15). The publication module (40) automatically distributes, "publishes" or "pushes" the information to the immediate and extended family members of a computer (15) which have shown an interest in the information. The subscription module (42) provides a computer (15) with the ability to show interest in or "subscribe" to information located on the computers (15) connected to the network (24).

35 Claims, 20 Drawing Sheets

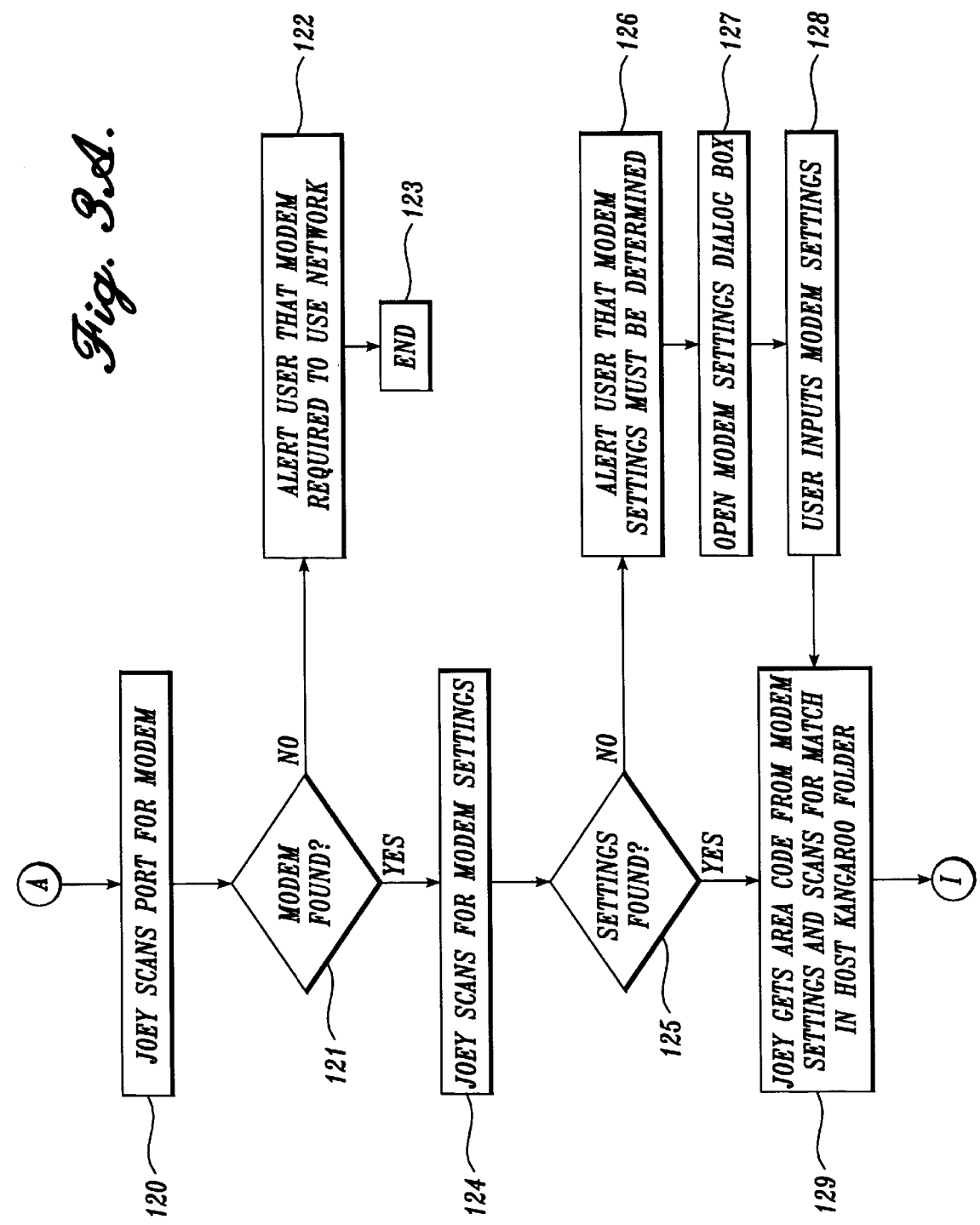

METHOD AND APPARATUS FOR AUTOMATICALLY DISSEMINATING INFORMATION OVER A NETWORK

RELATIONSHIP TO OTHER APPLICATIONS

This application is a continuation-in-part of U.S. patent application Ser. No. 08/452,596, filed May 25, 1995, now issued as U.S. Pat. No. 5,694,596, and entitled "ON-LINE DATABASE UPDATING NETWORK SYSTEM AND METHOD." The subject matter of U.S. Pat. No. 5,694,596 is specifically incorporated herein by reference.

FIELD OF THE INVENTION

This invention relates to on-line database networking and more particularly to the application of an on-line database updating network to responsible materials selection. More specifically, this invention relates to automatically and dynamically disseminating information over a network or other communications medium to those users, devices and/or applications who have shown an interest in the information.

BACKGROUND OF THE INVENTION

Communication networks are well-known in the computer communications field. By definition, a network is a group of computers and associated devices that are connected by a communications facilities or links. Network connections can be of a permanent nature, such as via cables, or can be of a temporary nature, such as connections made through telephone or other communication links. Networks vary in size, from a local area network (LAN) consisting of a few computers and related devices, to a wide area network (WAN) which interconnects computers and LANs that are geographically dispersed. An internetwork, in turn, is the joining of multiple computer networks, both similar and dissimilar, by means of gateways or routers that facilitate data transfer and conversion from various networks. A well-known abbreviation for internetwork is "internet." As currently understood, the capitalized term "Internet" refers to the collection of networks and routers that use a Transmission Control Protocol/Internet Protocol (TCP/IP) to communicate with one another.

Use of LANs, WANs and the Internet has recently seen explosive growth due to the increased ease in the ability to link geographically dispersed computers. As the amount of information distributed across these networks grows, and the speed with which information can be added or changed at any one location on a network increases; the risk of information becoming stale and outdated elsewhere in the network increases significantly and the tolerance for stale or outdated information decreases dramatically. Thus, specialized information management is needed which automatically updates distributed information and instills confidence in the validity or freshness of the updated information.

Heightened public and private awareness of environmental and ecological concerns has also created a need for specialized information management over WANs, LANs and the Internet. Problems of a tangible nature, such as landfill shortages, and problems of a less comprehensible nature, such as ozone depletion, have brought waste reduction and recycling to the front page of many fields of design, engineering, planning, and legislation.

Professional practices in the fields of design, engineering, planning, and legislation require the specification of materials to be used during production and/or construction of an object or environment. Informed materials selection, if done properly, can greatly reduce the stress put on ecosystems and societies by specifying "sustainable" materials and processes. Additionally, through the use of resources that enable responsible material selection at the outset of a project, the potential need for costly design changes later in the project lifecycle may be minimized.

The goal of providing environmentally responsible and sustainable materials and processes is a difficult one due to the diffused nature of the varied sources of information. Object and image creators require a designed, comprehensive research tool or reference resource to allow them to make inherently responsible and necessary choices quickly. Currently, time is the primary inhibitor of such research. Usually, by the time the appropriate information is located, the project is already done and "out the door." To provide the information necessary to the making of informed materials decisions, a resource is needed that will unify and organize the necessary information in one place.

In addition to the need for information management to facilitate research in the areas of ecologically responsible materials, materials processing, and materials recycling, there is also a need to make on-line communications and programs act in a more intuitive, less confusing, and less costly manner.

In summary, the Internet and various other LANs and WANs serve as a vast conduit of information to anyone using them. The proliferation of information on these networks has created the need for a method and apparatus to automatically update information distributed across a network. The method and apparatus should be capable of instantly communicating updated or new information to any network member or node that has shown an interest in that type of information, without a specific request for the updated or new information. Further, the method and apparatus should provide automatic propagation of information to all interested users while maintaining acceptable fault tolerance and efficient bandwidth use. As described in the following, the present invention provides a method and apparatus that meet these criteria and solves other shortcomings in the prior art.

SUMMARY OF THE INVENTION

The present invention is a method for automatically disseminating information via a network comprising a plurality of devices. In one embodiment of the present invention, the devices are organized into at least one immediate family of related devices. When a device within the immediate family receives or generates new or changed information, the device automatically disseminates the information to the other devices in its immediately family. The device does not wait for specific instruction to disseminate the updated information.

In another embodiment of the present invention, the devices are organized into at least one immediate family and at least one extended family once removed. Hence, when a device in the immediate family receives or generates new or changed information, the information is distributed to the devices of the immediate family, followed by the devices of the extended family once removed. Devices can also be organized into a plurality of immediate and extended families such that new or changed information is automatically propagated in the same manner throughout the immediate and extended families to those devices.

In accordance with yet other aspects of the invention, the information is propagated to only those nodes of the immediate and extended families which have previously indicated an interest in or subscribed to the information. Further, the information is stored in at least one module or module block of information. A module comprises a plurality of module blocks of information. In addition, a module block of information may comprise a module containing other module blocks. Consequently, when an update is made to the information, only the module block effected by the update is disseminated. Similarly, if the update affects an entire module, the new or changed module is disseminated.

A computer readable medium and an apparatus programmed to perform the above described method are yet other aspects of the present invention.

BRIEF DESCRIPTION OF THE DRAWINGS

The accompanying drawings, which are incorporated in and constitute a part of the specification, illustrate preferred embodiments of the invention, and together with the description serve to explain the principles of the invention. The terminology used in the figures is defined and explained in the Detailed Description of the Preferred Embodiment.

FIGS. 3A and 3B depicts a flow chart of the remote access procedure using the method of the present invention;

DETAILED DESCRIPTION OF THE PREFERRED EMBODIMENT

Figure 1:
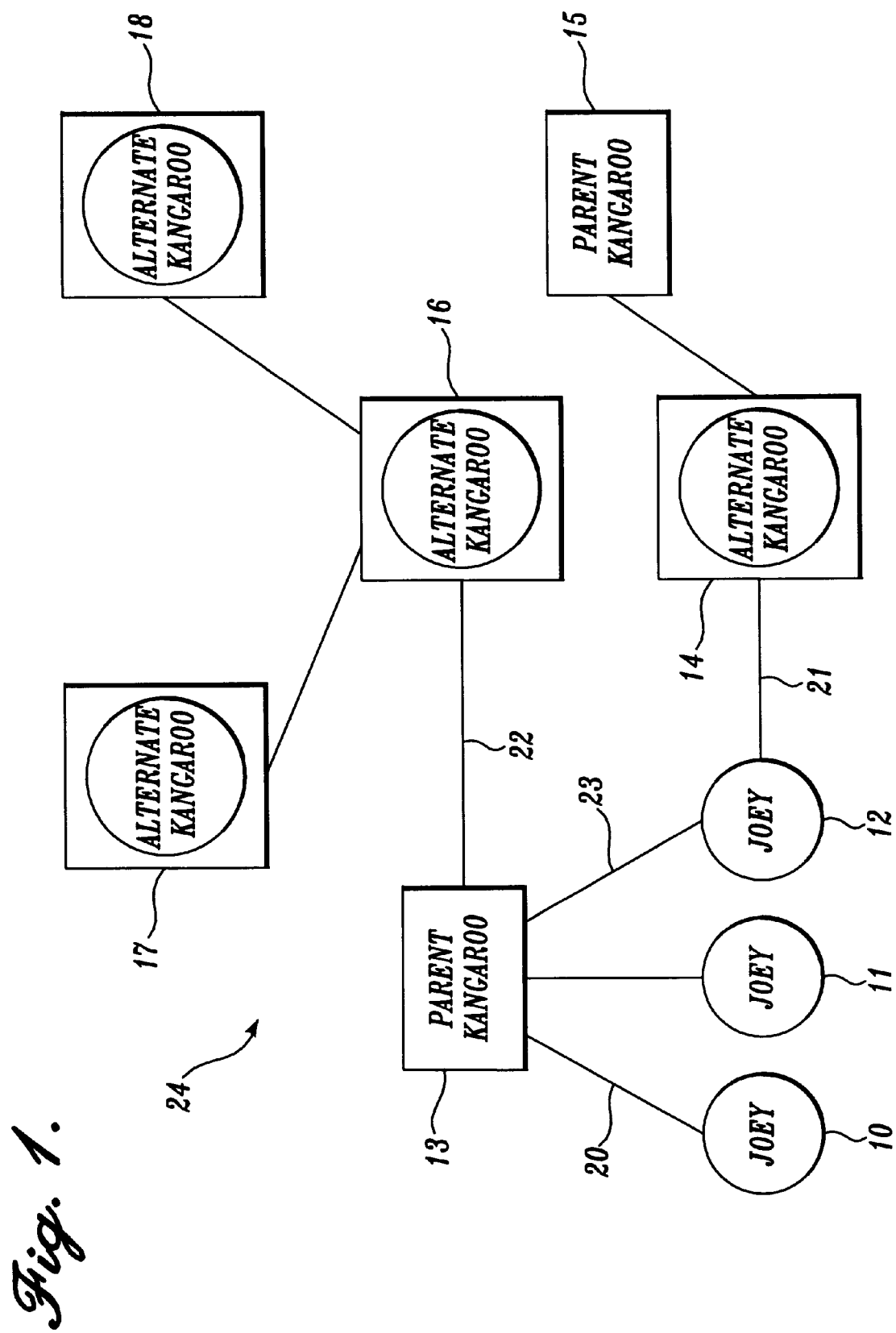
FIG. 1 illustrates a representative network structure over which information is disseminated according to the present invention.

According to the present invention, as embodied and broadly described herein, a method and apparatus for automatically disseminating information via a network is provided.

This document describes, in part, a system and method for a self-updating database network. However, it is possible and intended that the technology described herein may also be applied to non-database systems and software such as operating systems, operating system implementations, operating system add-ons, i.e., "extensions" for MACINTOSH®, or "modules" for WINDOWS®, software applications, software implementations and add-ons, application documents or files, and related applications. As used herein, the term "folder", which is platform-specific to APPLE MACINTOSH® computers, is used representatively and is meant to include any equivalent cross-platform counterparts such as directory, subdirectory, etc. Similarly, the term "desktop" is used representatively for purposes of illustration and is intended to include equivalent counterparts in different platforms.

As used in this document, the word "materials" may be defined as, but is not limited to, materials documentation including raw ingredients, processing, manufacturing, recycling, resources, chemistry, de-manufacturing, industry associations, alternatives, etc. Also, the word may be replaced with other fields of study or research such as psychology, medicine, or chemistry and may include associated subcategories/specialties respectively within the relevant field.

The present invention comprises a communications network having a communications channel, a user terminal, and a host terminal. The user terminal includes user-connecting means, user-memory means, user-input means, user-display means and user-processor means. The user terminal may, but is not required to, also include user-communications means.

The user-connecting means is connected between the communications channel and the user-processor means. The user-memory means is connected to the user-processor means. The user-input means is connected to the user-processor means. The user-display means is connected to the user-input means and to the user-processor means. If user-communications means were used, the user-communications means may be connected between the communications channel and the user-connecting means. Alternatively, the user-communications means may be integral to the user-processor means as is well known in the art.

The user-connecting means connects the user terminal to the communications channel. The user-memory means stores a plurality of user modules in a modules folder; each user module includes a plurality of user module blocks of information. The user-input means inputs user identification data and other data to the user terminal. The user-processor means processes user input data, scanning the user-connecting means, and accessing the communications channel. The user-display means is for displaying messages and screens to the user. The user-communications means, if included, is for sending user information and data from the user terminal to a remotely located host terminal over the communications channel.

The user-display means may be embodied as a display. The user-connecting means may be embodied as a data port, a serial port, or equivalent. The user-memory means may be embodied as a memory. The user-input means may be embodied as a keyboard, a voice-activated input device, or equivalent input structure. The user-processor means may be embodied as an INTEL PENTIUM® chip, INTEL 80486 chip, a Motorola 68000 chip, or any equivalent processor. An upgraded processor may be used if higher level operations are desired or if the updating procedure is to be performed as a background operation. More specifically, although references made to specific processors within this document, these references are for example only and cannot reflect the dynamic nature of the state-of-the-art. Instead, these references are only provided to convey that the minimal processor embodiment to allow the updating method to incur transparently "in the background", i.e., without the user's knowledge or input, would be any processor or system of processors which allow for "preemptive multi-tasking" as opposed to co-operative multi-tasking which requires top-level software/applications to give permission to any secondary or background software to allow such secondary or background software to command processor time.

The host terminal includes host-connecting means, host memory means, and host-processor means. Optionally, the host terminal also may include host-communications means, host input means, and host-display means.

The host-connecting means is connected between the communications channel and the host-processor means. The host memory means is connected to the host-processor means. If included, the host-communications means may be connected between the communications channel and the host-connecting means. Alternatively, the host-communications means may be integral to the host-processor means as is well known in the art. The host input means and the host-display means, if included, are connected to the host-processor means and to each other.

The host-connecting means is for connecting the host-processor means to the communications channel. The host memory means is for storing a plurality of host modules; each host module includes a plurality of host module blocks of information. The host module blocks of information may include non-updated host-module blocks of information and updated host-module blocks of information. As used in this application, a host module block of information is an "updated" block if it has an origin date more recent than an origin date of a corresponding user module block of information.

The host-processor means processes user identification data and other data received from the user terminal, directs the transmission of host module blocks of information to the user terminal. The host-communications means receives user information data and other data sent from a remotely-located user terminal to the host terminal using the communication channel. The host-communications means also sends host data from the host terminal to the remotely-located user terminal using the communications channel. The host input means, if included, inputs data to the host terminal. The host-display means displays messages and screens to a user.

The host-connecting means may be embodied as a data port, a serial port, or equivalent. The host memory means may be embodied as a memory. The host-processor means may be embodied as an INTEL PENTIUM® 80486 chip, INTEL® chip, a Motorola™ 30386 chip, or any equivalent processor. An upgraded processor may be used if higher level operations are desired or if the updating procedure is to be performed as a background operation. More specifically, although references made to specific processors within this document, these references are for example only and cannot reflect the dynamic nature of the state-of-the-art. Instead, these references are only provided to convey that the minimal processor embodiment to allow the updating method to occur transparently "in the background", i.e., without the user's knowledge or input, would be any processor or system of processors which allows for "preemptive multi-tasking" as opposed to co-operative multi-tasking which requires top-level software/applications to give permission to any secondary or background software to allow such secondary or background software to command processor time. The host-communications means may be embodied as a modem. The host input means, if included, may be embodied as a keyboard, a voice-activated input device, or equivalent. The host-display means may be embodied as a display.

In use, a user inputs user identification data to the user terminal using a user input device. In response to the user identification data, the user processor scans the user memory for user modules in the modules folder. In response to locating a user module having a first origin date, the user processor scans a data port for a host terminal. In response to finding a host terminal, the user processor accesses the communications channel to connect with the host terminal. The user terminal sends user identification data and data on the user module to the host terminal.

The host terminal, operatively coupled to the user terminal through the communications channel, accepts the user identification data from the user terminal. In response to the user identification and user module data, the host processor sends, over the communications channel, a host origin date for a host module corresponding to the user module. Responsive to receiving the host origin date for the host module, the user processor retrieves the user origin date and compares the user origin date to the host origin date. In response to determining that the host origin date is more recent than the user origin date, the user processor identifies those host module blocks of information, within the host module, having origin dates more recent than corresponding user module blocks of information, within the user module, as updated blocks. The user processor then downloads to the user memory the updated blocks. Alternately, in a secondary embodiment, the network may be configured such that, in response to determining that the host origin date is more recent than the user origin date, the user processor downloads the host module and replaces the user module with the downloaded host module.

If the user terminal and the host terminal were remotely located from one another, then the user terminal includes a user modem and the host terminal includes a host modem. After the user terminal has received user identification data and has located a user module in the modules folder, the user processor scans for a user modem. In response to finding a user modem with appropriate settings, the user processor accesses the communications channel to connect with the remotely-located host terminal. The remotely-located host terminal accepts the dialed connection through the host modem. The user module update procedure then continues in a manner equivalent to the user module update procedure followed with the local host.

The present invention may further include an alternate host terminal. The alternate host terminal comprises alternate host-connecting means, alternate host memory means, and alternate host-processor means. Optionally, the alternate host terminal may also include alternate host-communications means, alternate host input means and alternate host-display means.

The alternate host-connecting means is connected between the communications channel and the alternate host-processor means. The alternate host memory means is connected to the alternate host-processor means. If included, the alternate host-communications means may be connected between the communications channel and the alternate host-connecting means. Alternatively, the alternate host-communications means may be integral to the alternate host-processor means as is well known in the art. The alternate host input means and the host-display means, if included, are connected to the alternate host-processor means and to each other.

The alternate host-connecting means is for interfacing between the communications channel and the alternate host-processor means. The alternate host memory means is for storing a plurality of alternate host modules; each alternate host module includes a plurality of alternate host module blocks of information. The alternate host module blocks of information may include non-updated alternate host-module blocks of information and updated alternate host-module blocks of information. As used in this application, an alternate host module block of information is an updated" block if it has an origin date more recent than a corresponding user module block of information.

The alternate host-processor means is for processing user identification data and other data received from the user terminal and for directing the transmission of alternate host module blocks of information to the user terminal. The alternate host-communications means, if included, is for accepting a connection from a remotely-located user terminal and for sending alternate host module blocks of information to the remotely-located user terminal. The alternate host input means is for inputting data to the alternate host terminal. The alternate host display means, if included, is for displaying messages and screens to a user.

The alternate host-connecting means may be embodied as a data port, a serial port, or equivalent. The alternate host memory means may be embodied as a memory. The alternate host-processor means may be embodied as any of the processor chips previously identified in connection with the host processor means and subject to the same caveats regarding the state-of-the-art in preemptive multi-tasking requirements. The alternate host-communications means, if included, may be embodied as a modem. The alternate host input means, if included, may be embodied as a keyboard, a voice-activated input device, or equivalent. The alternate host-display means, if included, may be embodied as a display.

In use with the present invention, the alternate host terminal, operatively coupled to the user terminal through the communications channel, accepts user identification data from the user terminal. In response to the user identification data and user module data received from the user terminal, the alternate host processor sends, over the communications channel, an alternate host origin date for an alternate host module corresponding to the user module. The user processor, in response to receiving the alternate host origin date for the alternate host module, retrieves the user origin date and compares the alternate host origin date for the alternate host module to the user origin date of the corresponding user module. In response to determining that the alternate host origin date is more recent than the user origin date, the user processor identifies those alternate host module blocks of information, within the alternate host module, having origin dates more recent than corresponding user module blocks of information, within the user module, as updated blocks. The user processor then downloads to the user memory the updated blocks. Alternatively, in a secondary embodiment, the network may be configured such that, in response to determining that the alternate host origin date is more recent than the user origin date, the user processor downloads the alternate host module and replaces the user module with the downloaded alternate host module.

If the user terminal and the alternate host terminal were remotely located from one another, then the user terminal includes a user modem and the alternate host terminal includes an alternate host modem. After the user terminal has received user identification data and has located a user module in the modules folder, the user processor scans for a user modem. In response to finding a user modem with appropriate settings, the user processor accesses the communications channel to connect with the remotely-located alternate host terminal. The remotely-located alternate host terminal accepts the dialed connection through the alternate host modem. The user module update procedure then continues in a manner equivalent to the user module update procedure followed with the local alternate host.

The present invention also may be embodied as a method for updating databases using a network including a user terminal, a host terminal, and a communications channel. The network may further include an alternate host terminal.

The user terminal includes a display, an input device, a user data port, and a user terminal memory for storing user modules of grouped information in a modules folder. The host terminal includes a data port and a host terminal memory for storing host modules of grouped information.

The method of the present invention comprises the steps of activating the user terminal using the input device, scanning the modules folder in the user terminal memory for stored user modules, and locating a stored user module having a first origin date. The method further comprises the steps of locating a host terminal and connecting to the host terminal through the user data port, through the communications channel, and to the host data port. The method then includes the steps of scanning the host terminal memory for stored host modules, and locating a stored host module corresponding to the stored user module and having a host origin date. The method then comprises the steps of retrieving from the user terminal memory the user origin date and comparing, by the user terminal, the user origin date and the host origin date. The method then downloads the stored host module into the user terminal memory in response to the second origin date being more recent than the first origin date, and replaces the stored user module with the more recent stored host module and host origin date.

In response to the host origin date being more recent than the user origin date, the method may further comprise the steps of scanning, by the user processor, the stored user module for a plurality of user-module-block origin dates, and scanning the stored host module for a plurality of host-module-block origin dates. The plurality of user-module-block origin dates correspond with a plurality of user module blocks, respectively. Each user module of grouped information may be subdivided into such a plurality of user module blocks, each of which blocks may be updated, deleted, moved, or left unchanged; independently of the remaining plurality of user module blocks. Similarly, the plurality the host-module-block origin dates correspond with a plurality of host module blocks, respectively. Each host module of grouped information may be subdivided into such a plurality of host module blocks, each of which blocks may be updated, deleted, moved or left unchanged, independently of the remaining plurality of host module blocks.

The method further comprises the steps of comparing the plurality of user-module-block origin dates to the corresponding plurality of host-module-block origin dates, respectively, and downloading only those host module blocks within the stored host module having host-module-block origin dates more recent than user-module-block origin dates of respective user module blocks within the stored user module, as updated blocks. Using these method steps, only host module blocks which have been updated relative to corresponding user module blocks are downloaded over the communications channel to the user terminal memory as updated blocks. Host module blocks having host-module-block origin dates older than corresponding user-module-block origin dates are not downloaded.

In addition to downloading updated blocks, the user terminal can also identify new host-module blocks. A "new" host-module block is a host module block having no corresponding user-module block within the plurality of user module blocks. The method of the present invention further comprises the steps of downloading new host-module blocks into the user memory as updated blocks.

The method further comprises the steps of scanning the modules folder in the user terminal memory for additional stored user modules, and locating an nth stored user module having an $n^{th}$ user origin date. The method further comprises the steps of locating an $n^{th}$ host module, corresponding to the $n^{th}$ user module, and having an $n^{th}$ host origin date. The method then comprises the steps of retrieving from the user terminal memory the $n^{th}$ user origin date and comparing, by the user terminal, the $n^{th}$ user origin date and the $n^{th}$ host origin date. In response to the $n^{th}$ host origin date being more recent than the $n^{th}$ user origin date, the method then includes the steps of downloading the $n^{th}$ host module into the user terminal memory and replacing the $n^{th}$ user module with the more recent $n^{th}$ host module and $n^{th}$ host origin date.

In response to the $n^{th}$ host origin being more recent than the $n^{th}$ user origin date, the method may further comprise the steps of scanning the $n^{th}$ host module for $n^{th}$ host module blocks having origin dates more recent than corresponding $n^{th}$ user module blocks as updated blocks, and downloading the updated blocks.

Reference now is made in detail to the present preferred embodiments of the invention, examples of which are illustrated in the accompanying drawings, wherein like reference numerals indicate like elements throughout the several views.

As illustratively shown in FIG. 1, the communications network of the present invention includes, by way of example, user terminals called Joeys 10, 11, 12, host terminals called Parent Kangaroos 13, 15, and alternate host terminals called Alternate Kangaroos 14, 16, 17, 18.

The terminology of "Joeys" and "Kangaroos" is employed to convey the mobile nature of a user engaged in research using the network of the present invention. Kangaroos are mobile creatures and move from one area to another in search of food or other needs. A user terminal, i.e., Joey, is also "mobile" in the sense that the Joey can "travel" through the network in search of research data which can be gathered from any number of different host locations, i.e., Kangaroos.

A Joey is an individual user of the Kangaroo software who does not support other Joeys with information. A Joey can modify its own on-site databases, and can hop to Alternate Kangaroos to gather custom specific database information for the Joey's desktop. A Joey can also forward or upload new or updated information to its Parent Kangaroo's free archives.

Each host terminal, or Parent Kangaroo, has two sections. The first section, known as the free archives, contains unconfirmed information. The second section, known as the library, contains confirmed information. A Parent Kangaroo 13 supports or feeds information and program updates to the Joeys 10, 11, 12 which are connected to it. A Parent Kangaroo owns sample collections and can lend these sample collections to Joeys and to other Kangaroos when a sample request is received. Parent Kangaroos can be located at local libraries, schools, and at regional offices of industrial associations. For each Joey, a Parent Kangaroo is selected according to location; the Kangaroo nearest a particular Joey will become that Joey's Parent Kangaroo upon registration into the network.

Alternate Kangaroos, like Parent Kangaroos, own sample collections, and support and feed information and program updates to Joeys. Each Alternate Kangaroo has two sections. The first section, or the free archives, contains unconfirmed information. The second section, or the library, contains confirmed information. Alternate Kangaroos may be distinguished from Parent Kangaroos, however, in that Alternate Kangaroos contain and maintain specific databases and samples related to their particular specialty. For example, G.E. Plastics would be an Alternate Kangaroo providing specialized information related to plastics. Any person, association, or business considered by its peers to be an authority in a given area of expertise can become an Alternate Kangaroo.

As shown by the graphic depiction in FIG. 1, Alternate Kangaroos have a hybrid status in which they may sometimes act as Joeys and at other times act as Parent Kangaroos. This hybrid status is reflected in FIG. 1 by the circle within a rectangle configuration denoting each Alternate Kangaroo and arises from the function of the Alternate Kangaroos.

An Alternate Kangaroo acts both as a Joey and as a Parent Kangaroo, depending upon user needs. For example, Alternate Kangaroo 14 is a "Joey" to Parent Kangaroo 15. As a "Joey," a user enters user identification data, using a user-input device, into Alternate Kangaroo 14. As with any "Joey," the display of Alternate Kangaroo 14 is used to convey messages and screens to the user. At the same time, Alternate Kangaroo 14 fulfills Parent Kangaroo-type functions as an Alternate Kangaroo to Joey 12. Similarly, Alternate Kangaroo 16 can act as both a pseudo-Parent Kangaroo to Alternate Kangaroos 17, 18, and as a Joey to Alternate Kangaroos 17, 18. Alternate Kangaroo 16 may act as a Joey to Parent Kangaroo 13 and may also act as an Alternate Kangaroo to the Parent Kangaroo 13. Each Joey 10, 11, 12 is connected to a Parent Kangaroo 13. A Joey may also be connected to an Alternate Kangaroo 14. Additional Alternate Kangaroos may also be subscribed to by any given Joey.

In use of a network such as that depicted in FIG. 1, a user activates the Joey 12 by inputting user identification data. In response to the user identification data, the Joey 12 scans the modules folder in the Joey's memory for a stored user module. Upon locating, responsive to scanning the modules folder, a first stored user module having a first user origin date, the Joey scans the Joey's data port for the Parent Kangaroo 13. Locating the Parent Kangaroo 13, the Joey connects through the communications channel 23 to the Parent Kangaroo 13. The Joey then scans the Parent Kangaroo's memory for stored host modules. Upon locating a stored host module corresponding to the first stored user module in the Joey 12 and having a host origin date, the Joey 12 retrieves the first user origin date, and compares the first user origin date to the host origin date. In response to the host origin date being more recent than the user origin date, the Joey scans the Parent Kangaroo's stored host module for host module blocks having corresponding host-module-block origin dates more recent than user-module-block origin dates of corresponding user module blocks. The Joey then downloads over the communications channel 23, those host module blocks having origin dates more recent than corresponding user module blocks as updated blocks. These downloaded updated blocks are then used to update the stored user module in the Joey 12 by replacing the older blocks. The host module blocks may be downloaded in compressed format in accordance with various compression methodologies well known in the art, and then may be decompressed following successful file transfer, as is also known in the art. The terms "compression" and/or "decompression" as used in this document refer to any method or algorithm used by a program to reduce or expand, respectively, the size in bits, bytes, kilobytes, megabytes, etc. of a file or module of information.

The method then continues with the Joey 12 scanning the alternate modules folder in the Joey's memory for a stored user module. Upon locating a second stored user module having a second user origin date in the alternate modules folder, the Joey 12 scans the Joey's data port for the Alternate Kangaroo 14. Upon locating the Alternate Kangaroo 14, the Joey connects through the communications channel 21 to the Alternate Kangaroo 14. The Joey then scans the Alternate Kangaroo's memory for a stored alternate host module. Upon locating a stored alternate host module corresponding to the second stored user module and having an alternate host origin date, the Joey retrieves the second user origin date for the second stored user module from the alternate modules folder. The Joey then compares the second user origin date to the alternate host origin date. In response to the alternate host origin date being more recent than the second user origin date, the Joey identifies those alternate host module blocks having alternate-host-module-block origin dates more recent than user-module-block origin dates of corresponding user module blocks within the second stored user module, as updated blocks. The Joey 12 then downloads over the communications channel 21 the updated blocks from the Alternate Kangaroo 14. The updated blocks are then used to update the second stored user module in the Joey's memory by replacing the older blocks. The alternate host module blocks, like the host module blocks, may be downloaded in compressed format in accordance with various compression methodologies well known in the art, and may then be decompressed following successful file transfer.

Figure 2:
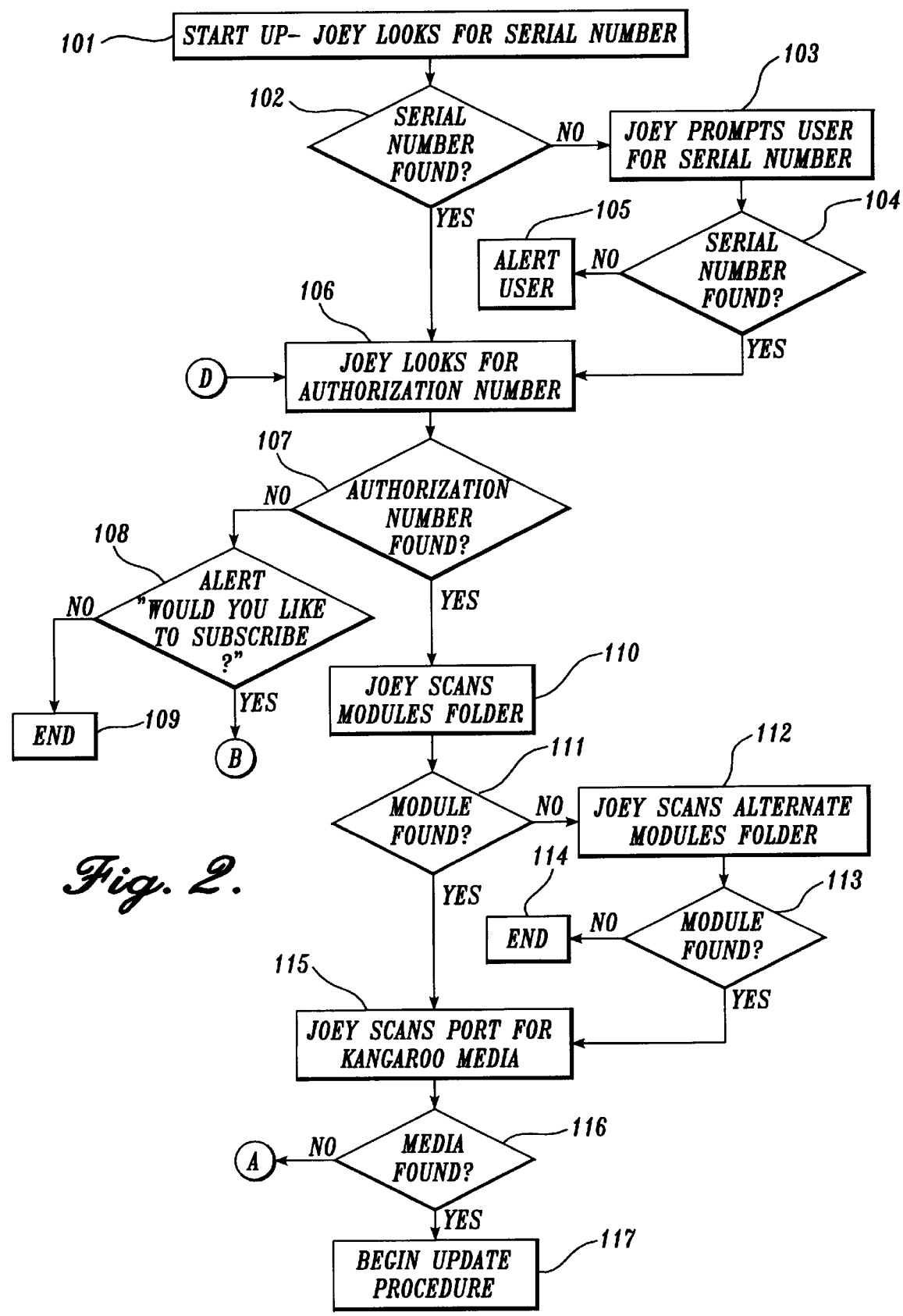
FIG. 2 depicts a flow chart of the start-up procedure and local access connection using the method of the present invention.

As depicted in FIG. 2, upon start-up a Joey looks 101 for the serial number of its Kangaroo subscription. If the serial number is not found 102, the Joey prompts 103 the user for a serial number. If the serial number is not found 104, the Joey alerts 105 the user that the serial number was not found or was in an invalid format. If a serial number is found 104, the Joey looks 106 for an authorization number. If an authorization number is not found 107, the Joey alerts 108 the user with a message asking the user if the user would like to subscribe to the Kangaroo network. If the user chooses to subscribe, the method continues as set forth in FIG. 4. If the user does not wish to subscribe, the start-up procedure ends 109.

Returning to the Joey's search for an authorization number, if an authorization number is found 107, the Joey scans 110 the modules folder in the Joey's memory. If a module is not found 111, the Joey scans 112 the alternate modules folder. If a module is not found 113 in the alternate module folder, the start-up process ends 114. If a module is found in the modules folder 111 or in the alternate modules folder 113, the Joey scans 115 a user terminal port for Kangaroo media. If Kangaroo media is not found 116, the method continues as set forth in FIG. 3A. If Kangaroo media is found 116, the Joey begins 117 the update procedure.

Figure 3B:
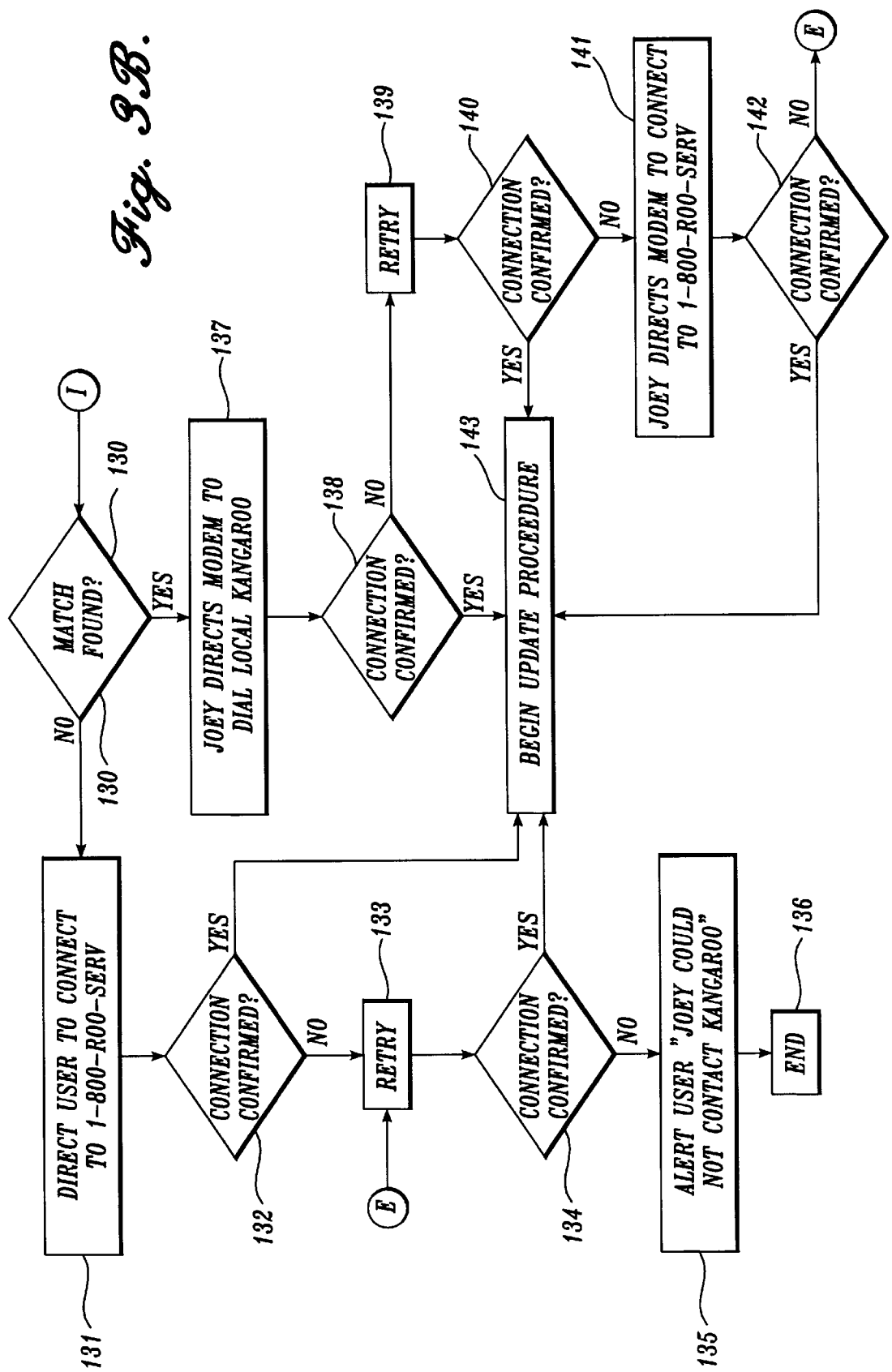

In response to the Joey scanning the user terminal port for Kangaroo media 115 and finding 116 Kangaroo media, the method continues as set forth in FIG. 3A. The Joey scans 120 the user terminal port for a modem. If a modem is not found 121, the Joey alerts 122 the user that a modem is required to use the Kangaroo network. If there were no modem, then the process for connecting the Joey to the Kangaroo network ends 123. If a modem were found 121, then the Joey scans 124 the modem for modem settings. As set forth in FIG. 3B, if modem settings were not found 125, then the Joey alerts 126 that modem settings must be determined. The Joey then opens 127 a modem settings dialog box. In response to the modem settings dialog box, the user inputs 128 modem settings.

Once modem settings are found 125, the Joey gets 129 an area code from the modem settings and scans for a match in the host Kangaroo's folder. As set forth in FIG. 3B, if a match were not found 130, then the Joey directs 131 the user to connect to the Kangaroo network using a specified telephone number such as 1-800-ROO-SERV. The number, 1-800-ROO-SERV, is used herein as a representative number for purposes of example only and may not refer to an actual number currently in use. If a telephone connection were not confirmed 132, then the Joey retries 133 to connect to 1-800-ROO-SERV. If after retrying, a connection were not confirmed 134, then the Joey alerts 135 the user that the Joey could not contact the Kangaroo. The process for connecting to the Kangaroo network then ends 136. If at any time after connecting to 1-800-ROO-SERV, a connection were confirmed 132, 134, then the Joey begins 143 the update procedure.

If when scanning 129 for a match in the host Kangaroo's folder, the Joey found 130 a match, the Joey then directs 137 the modem to dial the local Kangaroo. If a connection were not confirmed 138, then the Joey retries 139 to make a connection with the local Kangaroo. If a connection were not confirmed 140, then the Joey directs the modem to connect to the Kangaroo network using 1-800-ROO-SERV. If a telephone connection were not confirmed 142, then the Joey retries 133 to make a connection to 1-800-ROO-SERV. If a connection were not confirmed 134, then the Joey alerts 135 the user that the Joey could not contact the Kangaroo. The process for connecting to the Kangaroo network will then end 136. If, however, a connection were confirmed 134, 142, 138, then the Joey begins 143 the update procedure.

Figure 4:
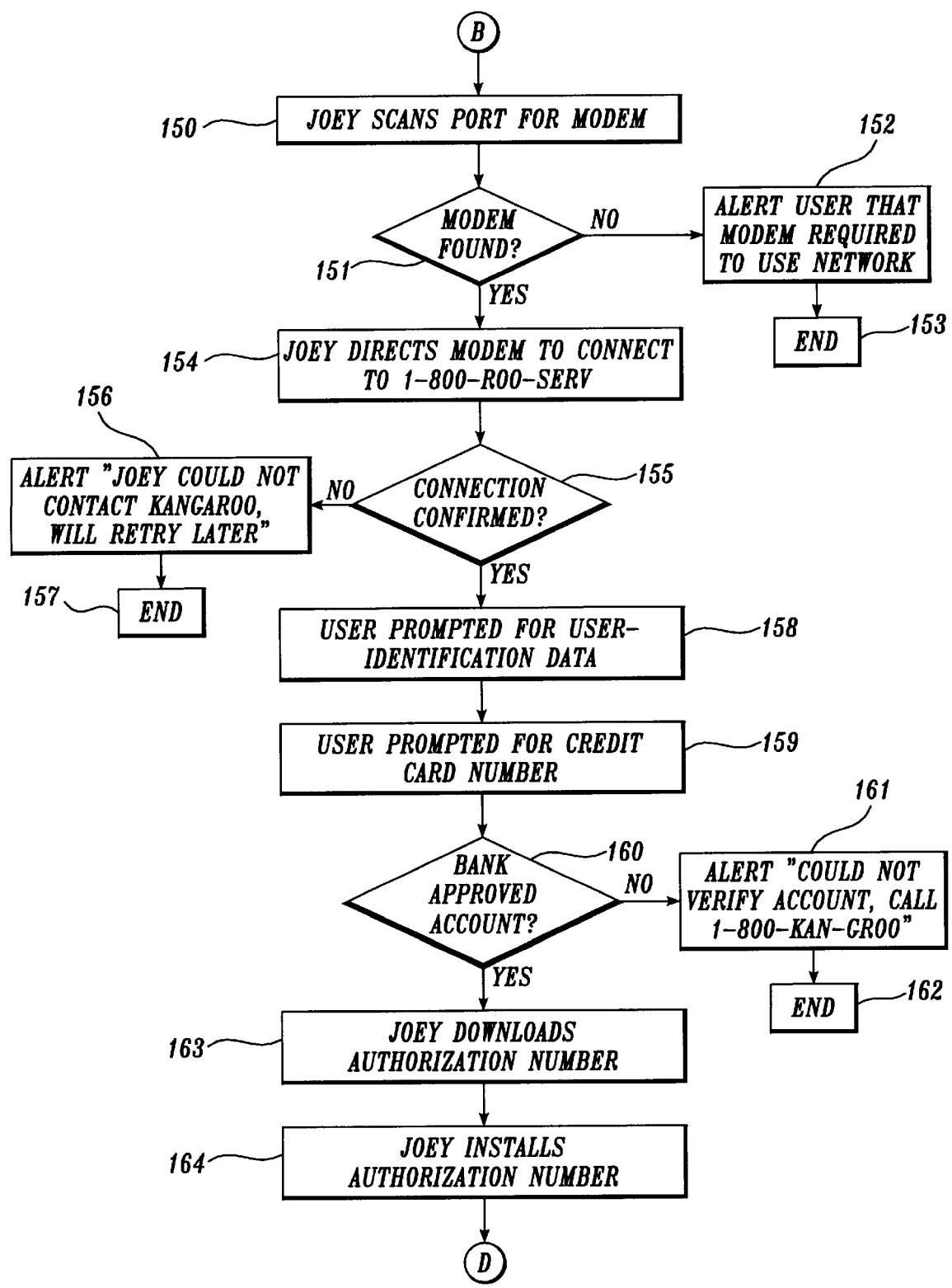
FIG. 4 depicts a flow chart of the registration procedure for access to the network of the present invention.

FIG. 4 depicts the user registration process. If during the start-up procedure the Joey were not successful in finding an authorization number, then the Joey alerts 108 the user and asks if the user would like to subscribe to the Kangaroo network. In response to an indication from the user that the user wishes to subscribe, the Joey scans 150 the user terminal port for a modem. If a modem were not found 151, then the Joey alerts 152 the user that a modem is required to use the network. The process for connecting to the Kangaroo network then ends 153. If a modem were found 151, then the Joey directs 154 the modem to connect to 1-800-ROO- SERV. If a connection is not confirmed 155, the Joey alerts 156 the user that the Joey could not contact the Kangaroo and will retry later. The process for connecting to the Kangaroo network then ends 157.

If a connection were confirmed 155, then the Joey prompts 158 the user for user-identification data. User identification data may include the user's full name, the user's company name, the user's address, the user's phone number, the user's fax number, and the user's e-mail address. The Joey then prompts 159 the user for a credit card number. If the bank did not approve 160 the account number provided by the user, then the Joey alerts 161 the user that the Joey could not verify the account. The user is then instructed to call 1-800-KAN-GROO. The number, 1-800-KAN-GROO, is used herein as a representative number for purposes of example and may not refer to an actual number currently in use. The process for connecting to the Kangaroo network then ends 162. If the bank approved 160 the account number provided by the user, then the Joey downloads 163 the authorization number and then installs 164 the authorization number. Once the authorization number is installed 164, the method continues as set forth in FIG. 2 with the Joey scanning 110 the modules folder, finding 111 a module, scanning 115 the user terminal port for Kangaroo media, finding 116 media, and beginning 117 the update procedure.

Figure 5:
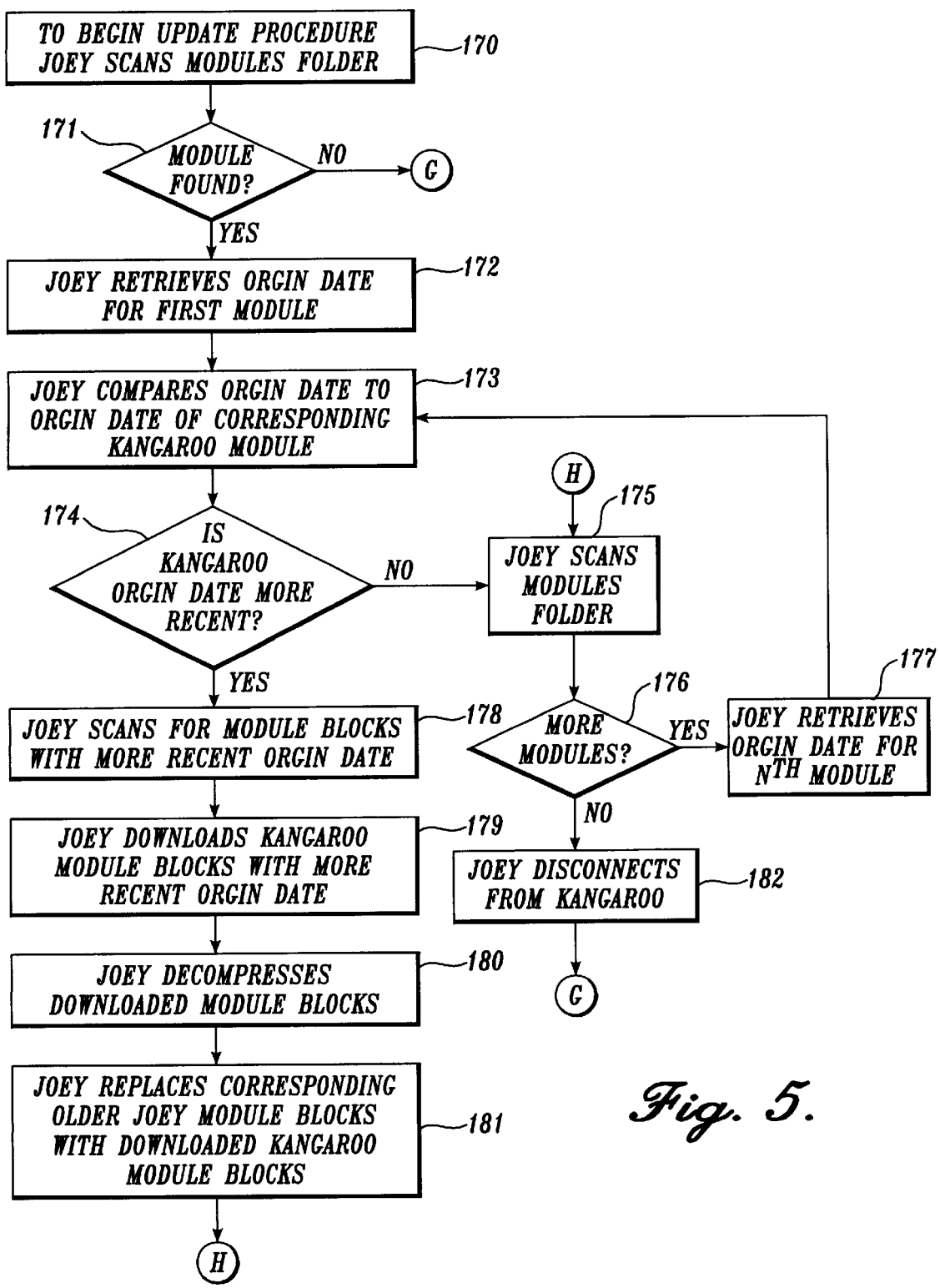
FIG. 5 depicts a flow chart of the update procedure between host and user terminals using the method of the present invention.
Figure 6A:
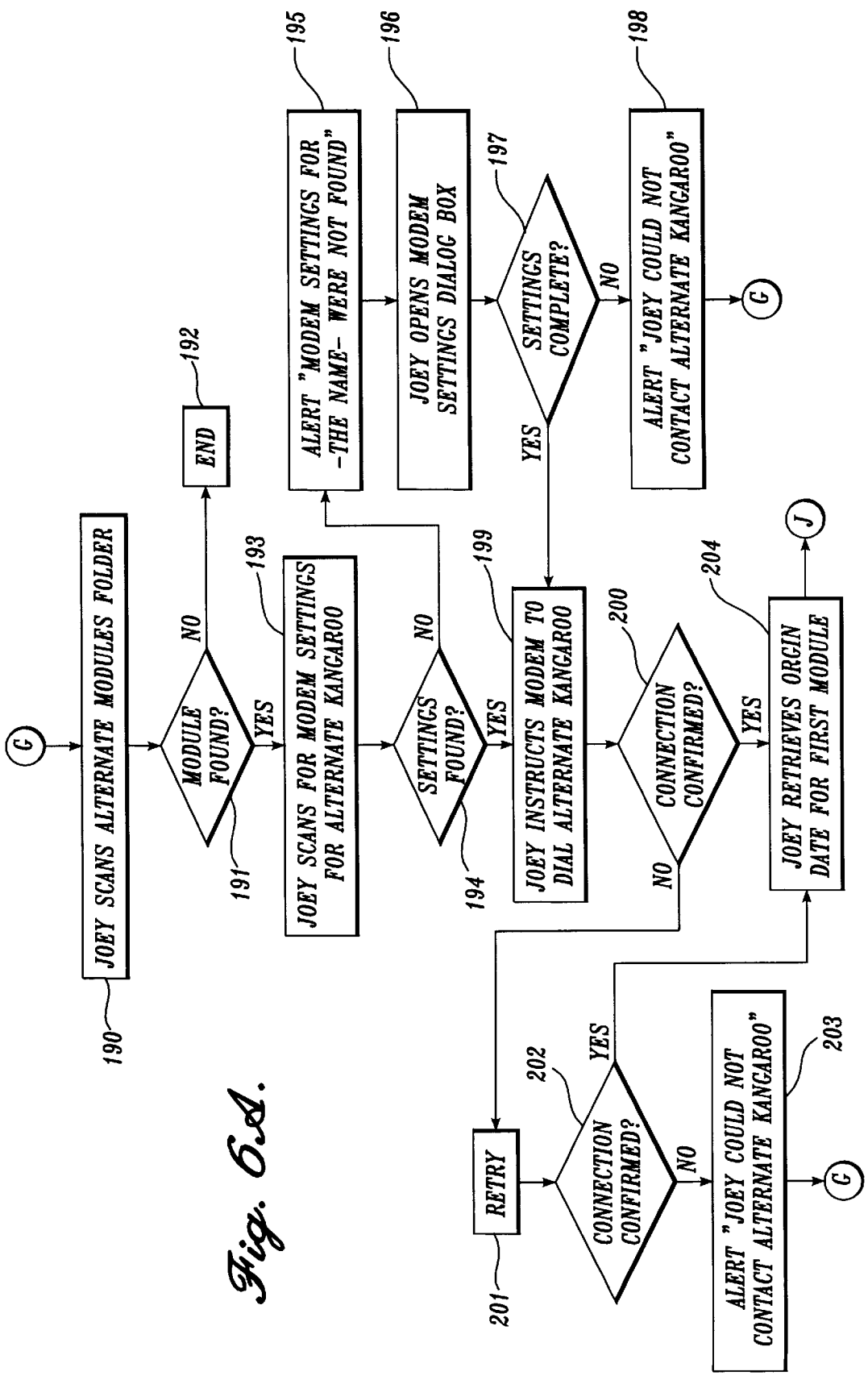
FIGS. 6A and 6B depict a flow chart of the update procedure between alternate host and user terminals using the method of the present invention.
Figure 6B:
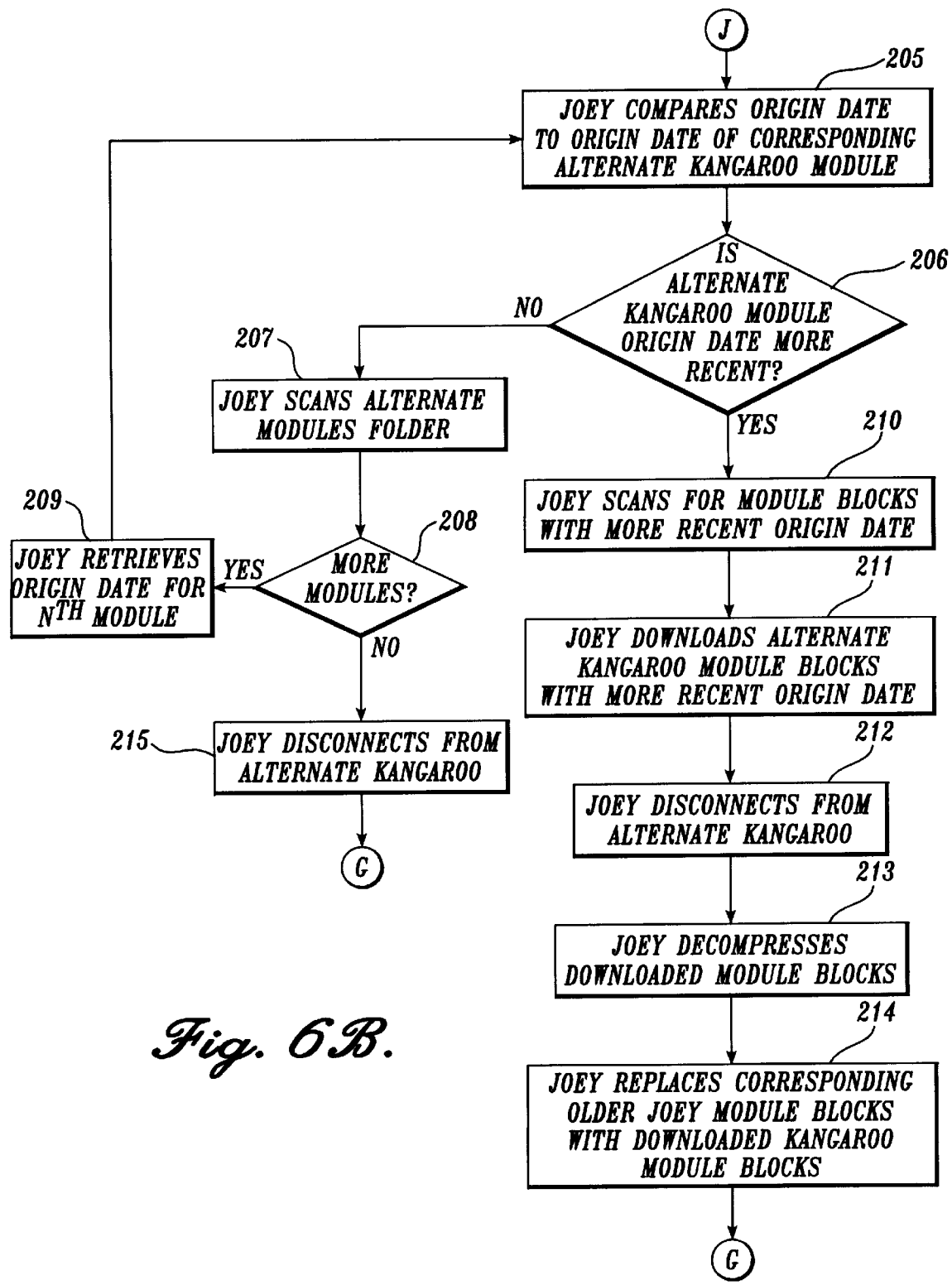

FIGS. 5 and 6A and 6B depict flow diagrams of the update procedure. Looking to FIG. 5, to begin the update procedure the Joey scans 170 the modules folder in the Joey's memory. If a module were not found 171, then the method continues as set forth in FIG. 6A. If a first module were found 171, then the Joey retrieves 172 the origin date for the first module. The Joey then compares 173 the retrieved origin date retrieved to the origin date of a corresponding Kangaroo module. If the Kangaroo origin date were not more recent 174 than the origin date of the first module, then the Joey scans 175 for more modules. If more modules were not found 176, then the Joey disconnects 182 from the Kangaroo. The method then continues as set forth in FIG. 6A.

If more modules were found 176, then the Joey retrieves 177 an origin date for the next module. The Joey then compares 173 the origin date of the next module to the an origin date of a corresponding Kangaroo module. If the Kangaroo origin date were not more recent 174 than the origin date of the next module, then the Joey again searches for more modules and repeats the steps of retrieving 177 an origin date and comparing 173 that retrieved date to an origin date of a corresponding Kangaroo module for all remaining modules found. If the Kangaroo origin date were more recent 174 than the origin date of the Joey module being compared, then the Joey scans 178 for module blocks within the Kangaroo module having a more recent origin date than the origin date of the Joey module being compared. The Joey downloads 179 those Kangaroo module blocks having a more recent origin date than the origin date of corresponding Joey module blocks. The Joey then decompresses 180 the downloaded blocks, if the blocks were downloaded in a compressed format, and replaces 181 the corresponding older Joey module blocks with the downloaded Kangaroo module blocks.

After the first module has been updated, the Joey then scans 175 the modules folder for more modules. If more modules were not found 176, then the Joey disconnects 182 from the Kangaroo. The method then continues as set forth in FIGS. 6A and 6B. If more modules were found 176, then the Joey repeats the steps of retrieving an origin date 177 for the module found, comparing 173 the origin date to an origin date of a corresponding Kangaroo module, scanning 178 for module blocks having an origin date more recent than an origin date of corresponding Joey module blocks, downloading 179 those Kangaroo module blocks having an origin date more recent than the origin date of corresponding Joey module blocks, decompressing 180 the downloaded blocks, and replacing 181 older Joey module blocks with the downloaded Kangaroo module blocks.

Once the Joey has scanned the modules folder and has updated all modules found, the method continues as set forth in FIG. 6A with the Joey scanning 190 the alternate modules folder. If a module were not found 191 in the alternate modules folder, then the process for connecting to the Kangaroo network ends 192. If a module were found 191 in the alternate modules folder, then the Joey scans 193 from modem settings for an Alternate Kangaroo. If modem settings were not found 194, then the Joey alerts 195 the user that modem settings for the Alternate Kangaroo were not found. The Joey then opens 196 a modem settings dialog box. If in response to the modem settings dialog box the settings were not complete 197, then the Joey alerts 198 the user that the Joey could not contact the Alternate Kangaroo. The Joey then continues to scan 190 the alternate modules folder for modules within additional Alternate Kangaroos to which the Joey may subscribe. If no module were found 191 within an additional Alternate Kangaroo, the update process ends 192. If a module were found 191 with an additional Alternate Kangaroo, the Joey repeats the sequence of steps as set forth in FIGS. 6A and 6B for contacting and updating from the additional Alternate Kangaroo. As desired by the user, the process repeats until contact has been completed or attempted for all Alternate Kangaroos to which the Joey subscribes.

If, in response to the modem settings dialog box, the settings were complete 194, 197 then the Joey instructs 199 the modem to dial the Alternate Kangaroo. If a connection were not confirmed 200, then the Joey retries 201 to make a connection with the Alternate Kangaroo. If after retrying the connection were not confirmed 202, then the Joey alerts 203 the user that the Joey could not contact the Alternate Kangaroo. The Joey then continues scanning 190 the alternate modules folder for modules within additional Alternate Kangaroos to which the Joey may subscribe. If no module were found 191 within an additional Alternate Kangaroo, the update process ends 192. If a module were found 191 with an additional Alternate Kangaroo, the Joey repeats the sequence of steps as set forth in FIGS. 6A and 6B for contacting and updating from the additional Alternate Kangaroo. As desired by the user, the process repeats until contact has been completed or attempted for all Alternate Kangaroos to which the Joey subscribes.

If a connection were confirmed 200, 202, then the Joey retrieves 204 an origin date for the first module. The Joey then compares 205 the origin date of the first module to an origin date of a corresponding Alternate Kangaroo module. If the Alternate Kangaroo's module did not have an origin date more recent 206 than the origin date of the Joey's module, then the Joey scans 207 the alternate modules folder for more modules. If more modules were not found 208 then the Joey disconnects 215 from the Alternate Kangaroo. The Joey then scans 190 the alternate modules folder for modules within additional Alternate Kangaroos to which the Joey may subscribe. If no module were found 191 with an additional Alternate Kangaroo, the update process ends 192. If a module were found 191 with an additional Alternate Kangaroo, the Joey repeats the sequence of steps as set forth in FIGS. 6A and 6B for contacting and updating from the additional Alternate Kangaroo. As desired by the user, the process repeats until contact has been completed or attempted for all Alternate Kangaroos to which the Joey subscribes.

If more modules were found 208, then the Joey retrieves 209 an origin date for the next module found. The Joey then compares 205 the origin date for the next module found to an origin date of a corresponding Alternate Kangaroo module's module. If the Alternate Kangaroo module's origin date were not more recent than the origin date of the next module 206 then the Joey continues to scan 207 for more modules, to retrieve 209 origin dates for additional modules found, and to compare 205 origin dates for additional modules found to corresponding Alternate Kangaroo module origin dates.

If the Alternate Kangaroo module's origin date were more recent than the origin date of the Joey's module 206, then the Joey scans 210 the Alternate Kangaroo module for module blocks within the Alternate Kangaroo module having origin dates more recent than the origin date of corresponding module blocks within the Joey's module. The Joey downloads 211 the Alternate Kangaroo module blocks having origin dates more recent than the origin date of corresponding Joey module blocks. The Joey then disconnects 212 from the Alternate Kangaroo, decompresses 213 the downloaded blocks, if the blocks were downloaded in compressed format, and replaces 214 corresponding older Joey module blocks with the downloaded Alternate Kangaroo module blocks.

The sequence of steps set forth in the flow diagram of FIGS. 6A and 6B is then repeated for any additional modules found within the alternate modules folder. If no additional modules are found 191, the update procedure ends 192.

Figure 7:
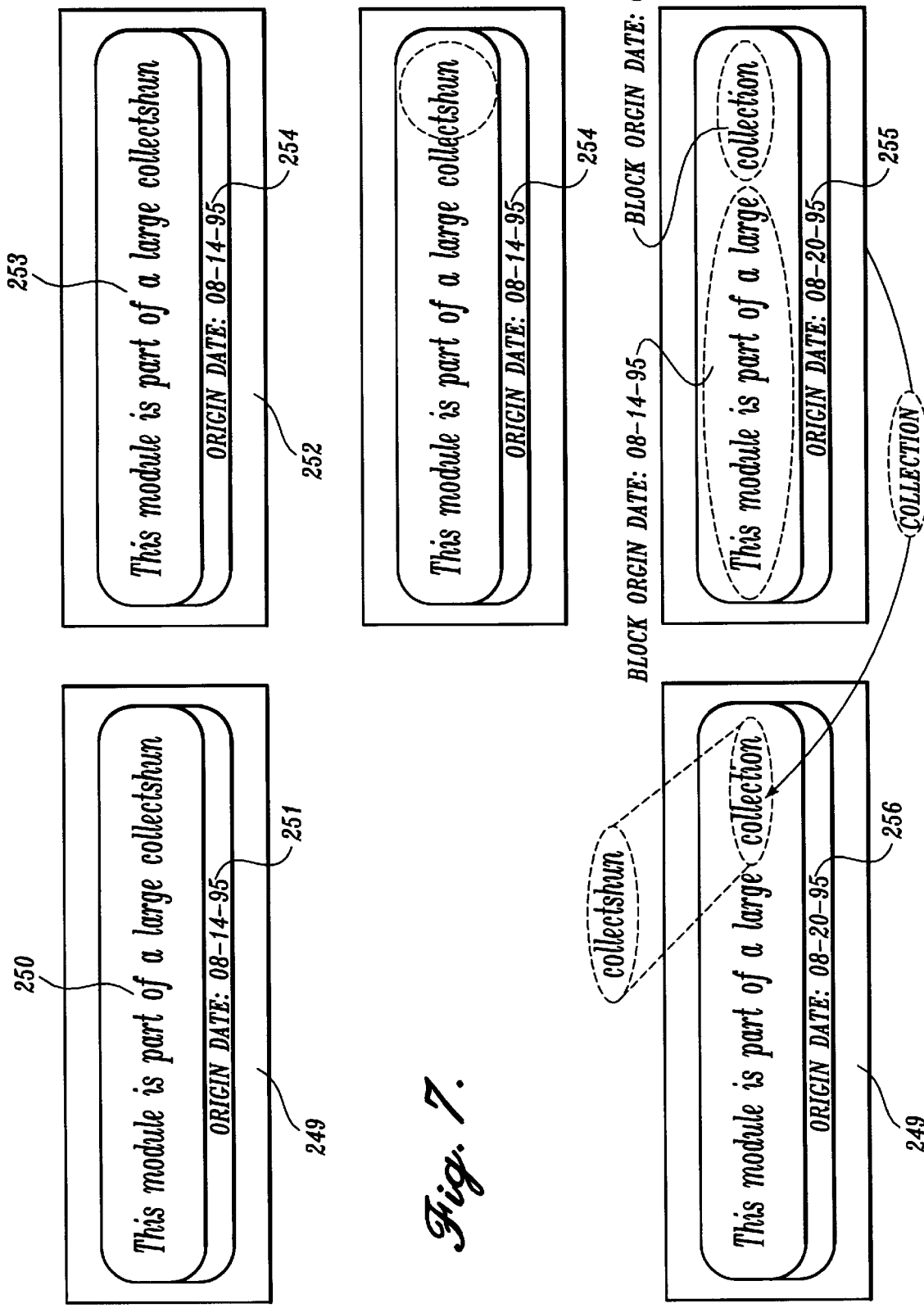
FIG. 7 illustrates an example of the updating procedure of the present invention.

To better illustrate the objects and advantages of the present invention, specific scenarios depicting the invention in use will be described. While the number of different screen displays that may be encountered during use of the present invention makes inclusion of all such screen displays impractical, FIGS. 7–11 provide a generalized representation of possible screen displays for purpose of illustration. FIG. 7 illustrates a working example of the update procedure of the present invention. As already discussed, a module comprises a plurality of blocks, each of which blocks may be separately updated. In the example shown, the word "collectshun" may be thought of as a block within the module, "This module is part of a large collectshun". Responsive to a change in the block, "collectshun" on Aug. 20, 1995, for example, the module origin date is updated. However, the blocks within this module that were not changed, "This" "module", "is", "part", "of", "a" and "large" retain the original origin date of Aug. 14, 1995. A user terminal with an origin date of Aug. 14, 1995 accessing the host on Aug. 21, 1995 would download only those blocks having an origin date more recent than Aug. 14, 1995 which, in this example, would be only the changed block, "collection". Such selecting downloading of only updated blocks reduces bandwidth requirements and saves processing time.

Figure 8:
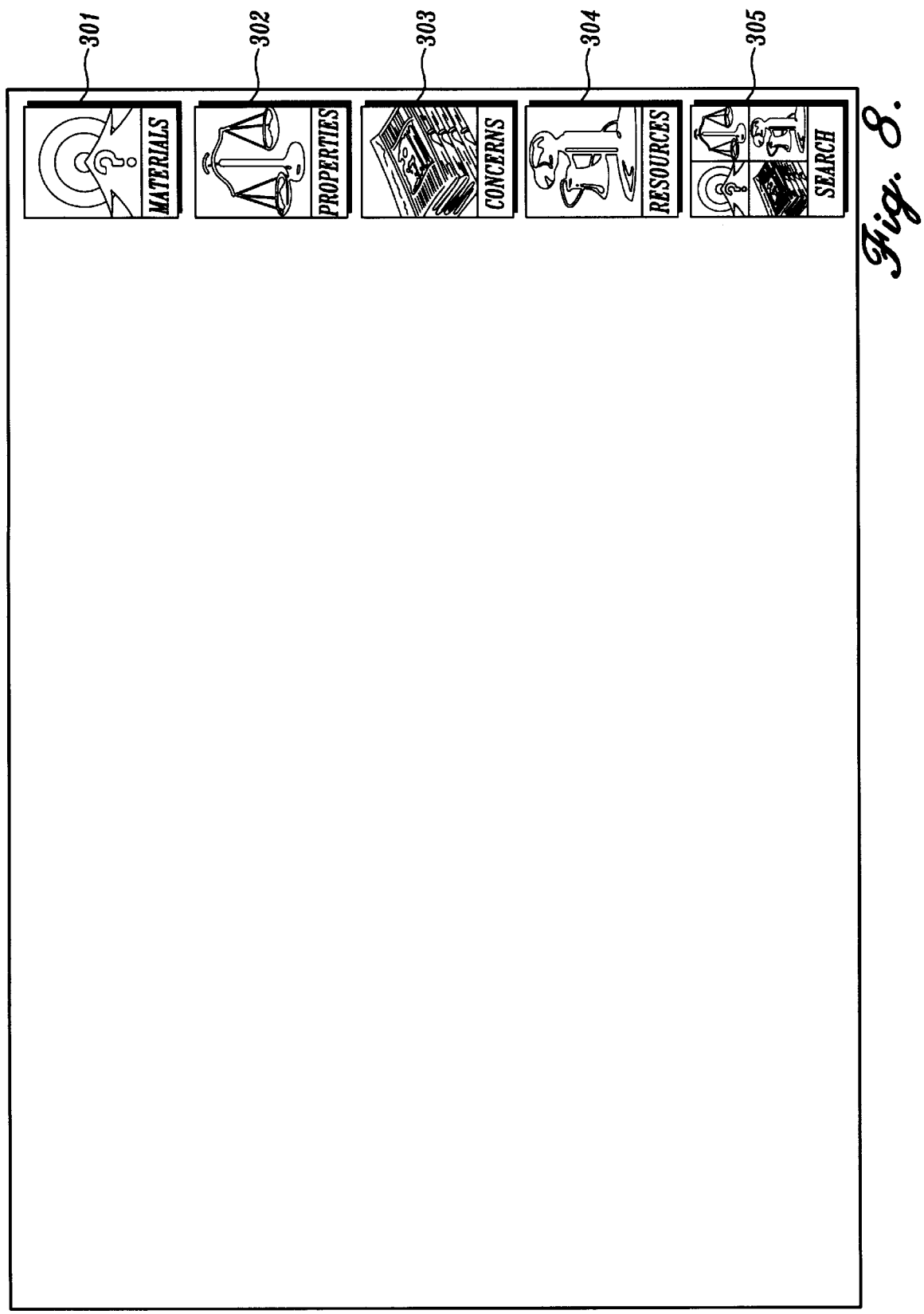
FIG. 8 depicts a representative upper-level screen display with pop-up menus.
Figure 9:
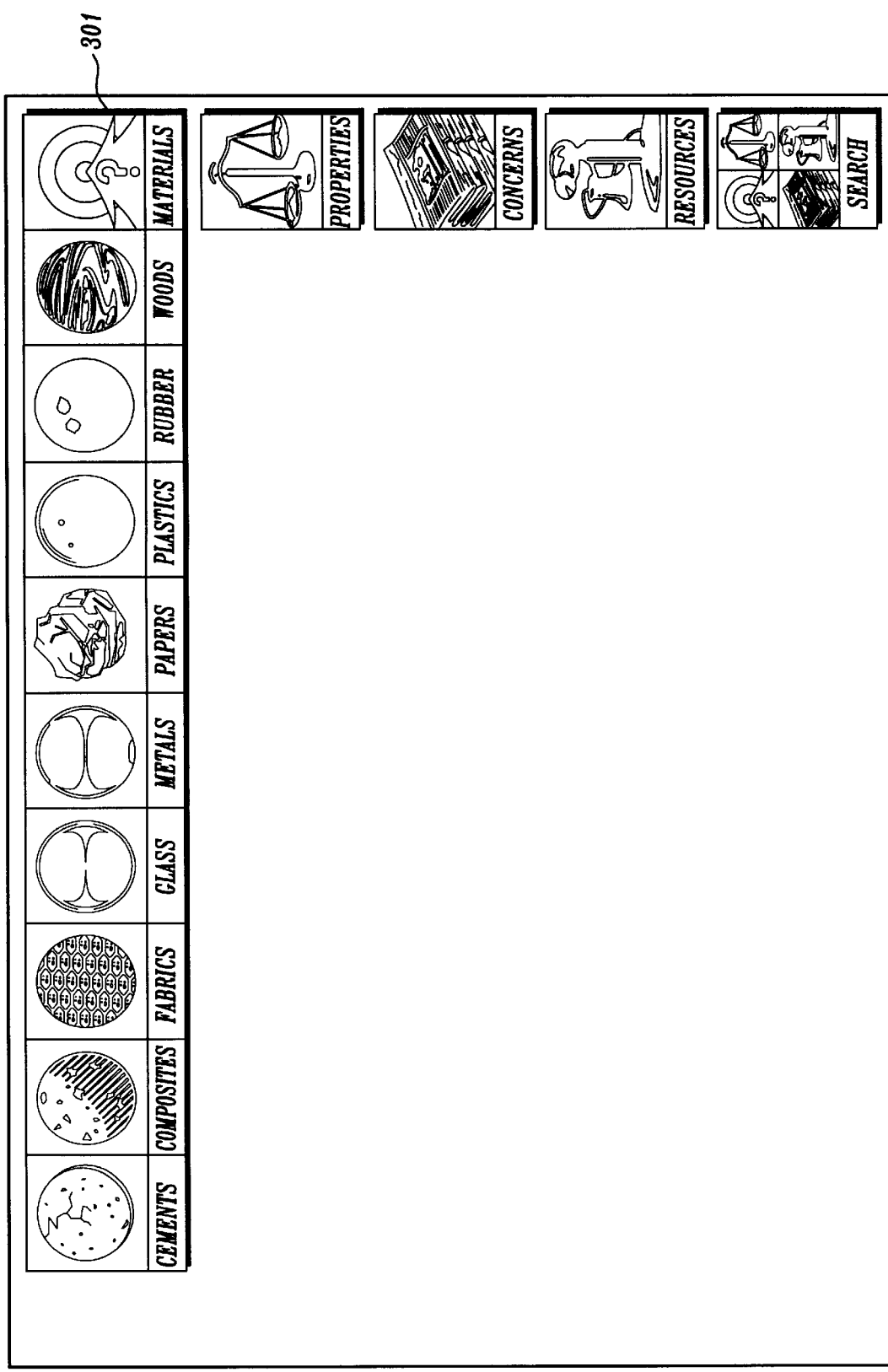
FIG. 9 depicts representative choices within a "Materials" pop-up menu.
Figure 10:
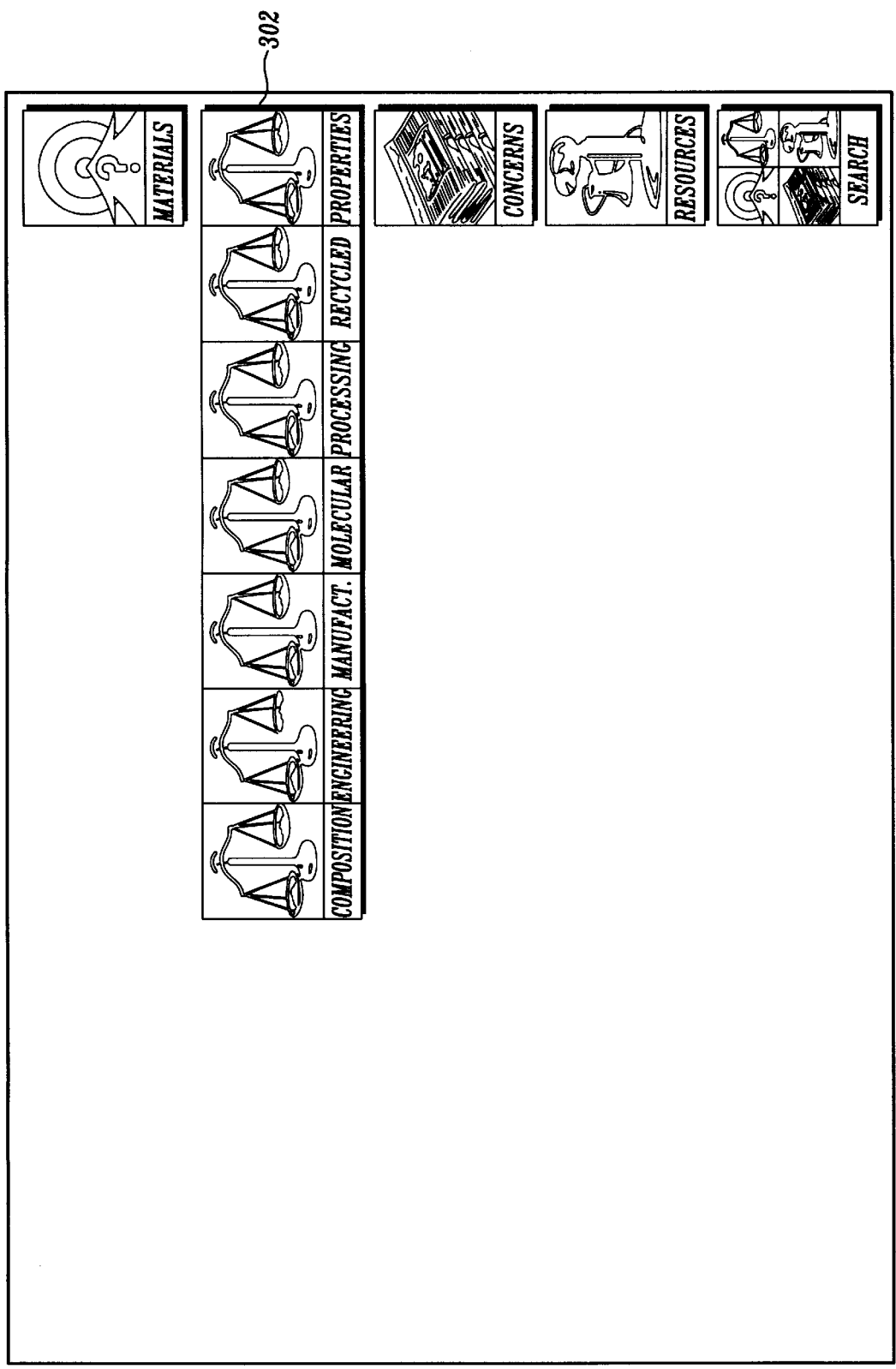
FIG. 10 depicts representative choices within a "Properties" pop-up menu.
Figure 11:
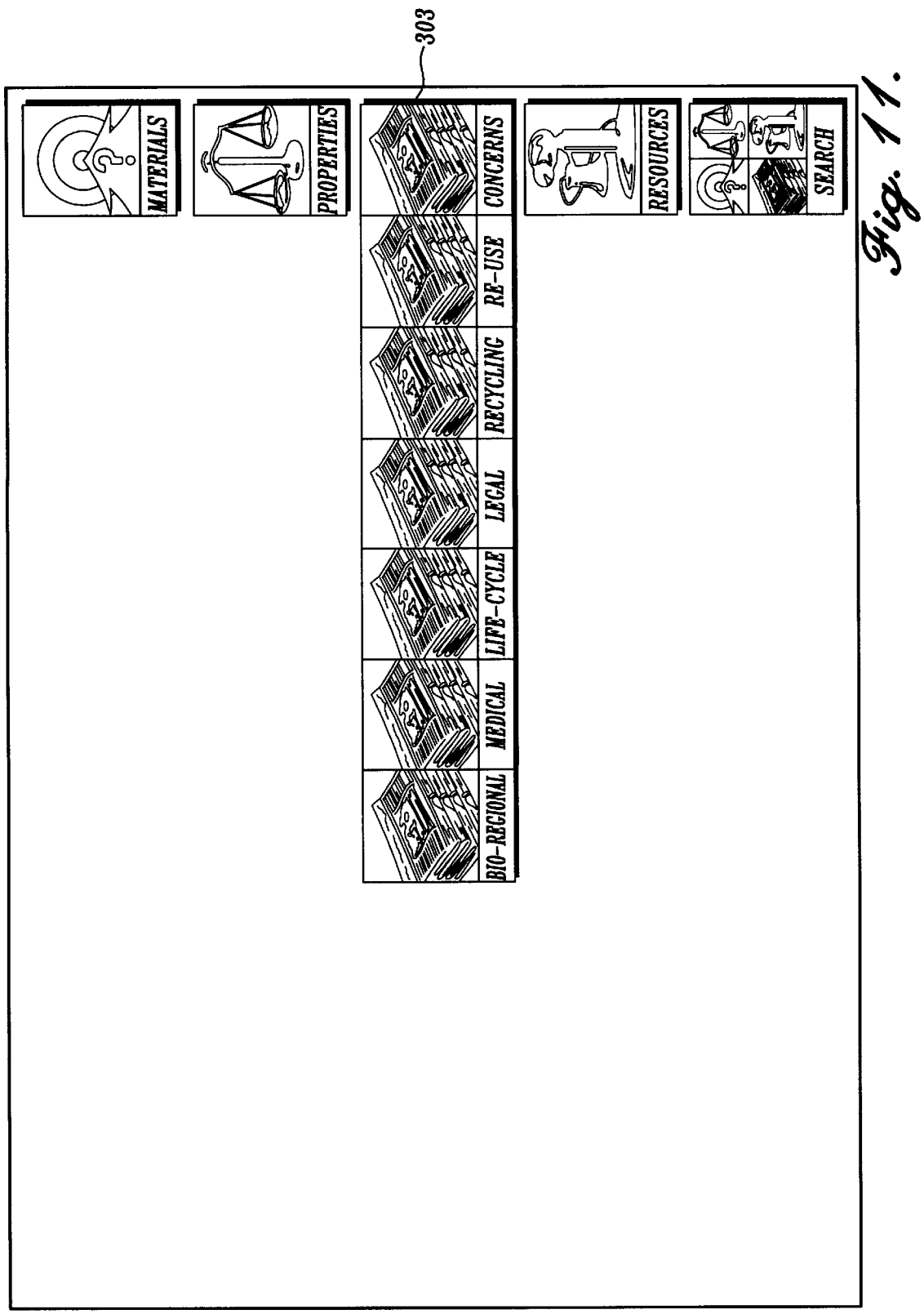
FIG. 11 depicts representative choices within a "Concerns" pop-up menu.
Figure 12:
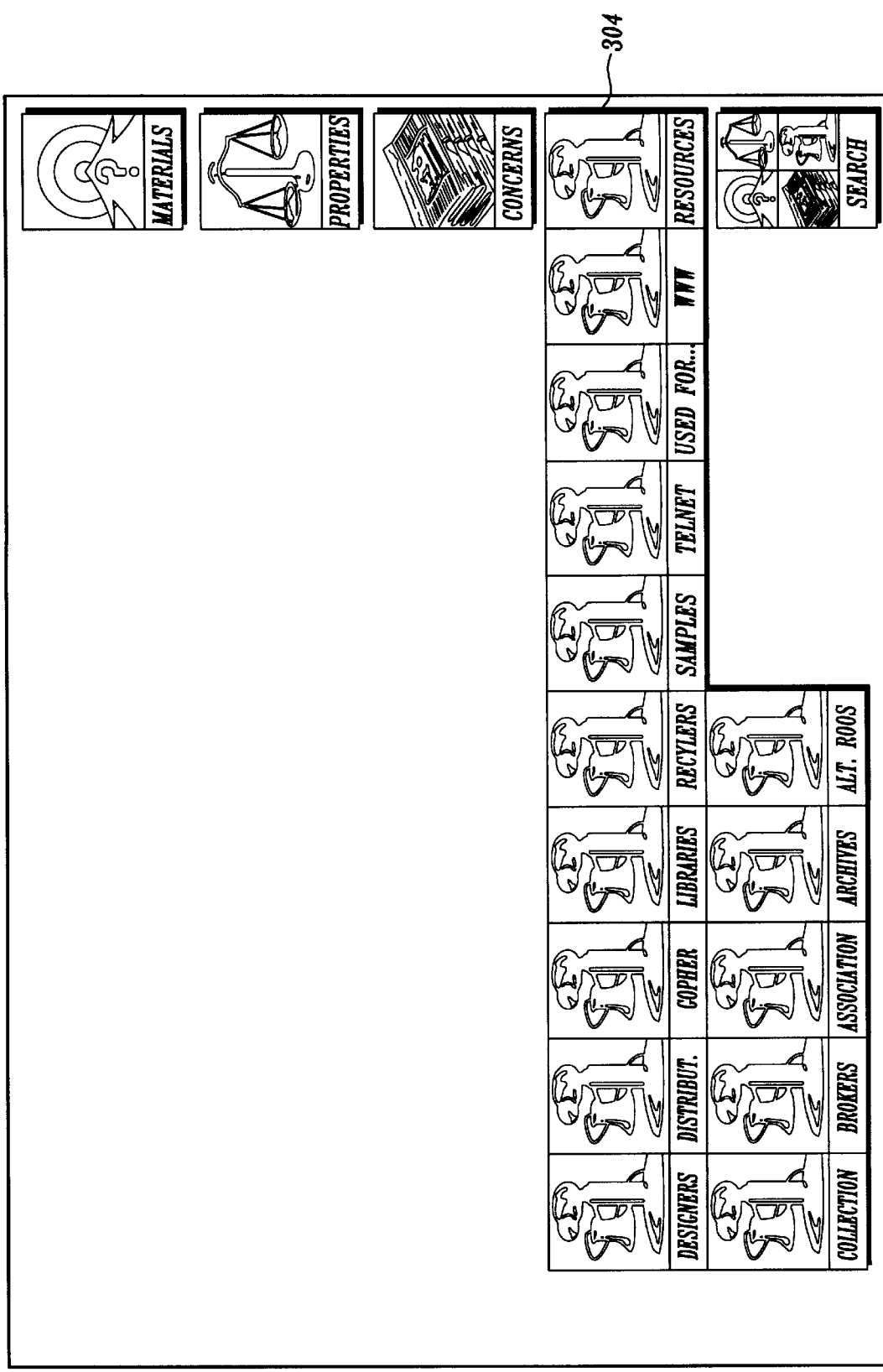
FIG. 12 depicts representative choices within a "Resources" pop-up menu.

FIG. 8 depicts the basic pop-up menu choices of "Materials" 301, "Properties" 302, "Concerns" 303, "Resources" 304, and "Search All" 305. Holding the mouse button down on the "Materials" 301 pop-up menu provides a listing of possible materials choices as depicted in FIG. 9. Holding the mouse button down on the "Properties" 302 pop-up menu provides a listing of all possible levels and types of property characteristics as depicted in FIG. 10. Various considerations associated with a material may be further explored using the "Concerns" 303 pop-up menu to present specific selection areas as depicted in FIG. 11. Finally, FIG. 12 provides a representative categorization of resources selectable using the "Resources" 304 pop-up menu. As can be seen from these representative screen displays, the system and method of the present invention may be readily adapted to any number of applications and may be easily updated and supplemented within each application as new information becomes available.

Scenario 1—Industrial Design

In the first scenario, the Joey user is depicted as an industrial designer who is working on a project to design a solar powered street lamp. As part of this project, the industrial designer must specify a material from which the lamp housing will be constructed. This material could be aluminum, steel, plastic, etc. When choosing from these material choices, the industrial designer must be aware of the need to meet certain strength and hardness requirements for the street lamp application. These strength and hardness requirements are set forth by the Department of Transportation in a specialized set of codes for signs, signals, and lighting. The industrial designer may access these codes to determine the minimum tolerance for foot-pounds per square inch that a standing structure such as a solar powered street lamp must withstand to account for wind, collision, or related stress. Once a material has been selected, the industrial designer may use the network of the present invention to determine sources of supply for the chosen material. Finally the industrial designer can use the network to locate a specific manufacturer or manufacturers capable of meeting the needs of the project.

In addition to the traditional considerations just set forth, current industrial designers may also wish to determine the extent to which a chosen material may be considered to be socially and environmentally responsible. In making such a determination, the designer may consider the use of recycled material.

When considering recycled material, the industrial designer of the present scenario needs to determine whether the supply of the recycled material is capable of matching the requirements of mass production associated with the street lamp. If the recycled material cannot meet these requirements, then the industrial designer may consider alternative materials which could be used which would still have minimal environmental impact throughout the product lifecycle of the street lamp.

For the purposes of this scenario, it will be assumed that the industrial designer's Joey has been registered and so has full access to all Kangaroo resources. Accordingly, the industrial designer's Joey is set up in the materials format, with additional Kangaroo subscriptions to American Aluminum, GE Plastics, U.S. E.P.A., Miles Polymers, U.S. Steel, the Library of Congress, and the Smithsonian Institution. Subscriptions may be available with or without a fee dependent upon the subscription provider.

Once the industrial designer has sketched out the street lamp and has a design concept, the designer goes to his or her computer terminal and launches the Kangaroo program. The industrial designer's first goal is to identify the minimum tolerance of foot-pounds per square inch required by the Department of Transportation of a standing structure to account for wind or collision on the side of the roadway. The industrial designer then conducts a search of the materials databases to find a common material that will satisfy the Department of Transportation's requirements. The industrial designer will then select that material having the least environmental impact. When this preliminary search is concluded, the designer will prepare a report detailing his or her research and recommendations.

Looking more specifically at the operation of the Kangaroo program once launched, the Joey scans the configuration folder and determines which databases are currently subscribed to by the Joey. The Joey then connects, using the modem, to the local Parent Kangaroo, and compares the origin dates of the Joey's databases to their counterparts at the Parent Kangaroo. If any of the origin dates at the Parent Kangaroo are newer than the corresponding origin dates of the Joey, the Joey requests a download of all new information for the respective databases from that or any other appropriate Parent Kangaroo.

Once all new information for the respective databases has been downloaded to the user Joey's memory, the designer selects "Alternate Kangaroos" from the resources pop-up palette. Selecting "Alternate Kangaroos" presents the designer with a dialog box asking whether or not the user wishes to limit the search to only a certain country or region or whether to list all available Alternate Kangaroos. For the purposes of this scenario, the industrial designer decides to limit the search to only those Kangaroos within the United States.

Once the search has been limited, a new window opens, entitled "Alternate Kangaroo. From this window the industrial designer selects the "Government Organizations" from the "Types" pop-up palette. The window is then entitled "U.S. Government" and has a scrolling list of available government organization Kangaroo databases. The designer then selects, using the mouse button, the list item named "U.S. Department of Transportation."

The window is now entitled "U.S. D.O.T.," and has a welcoming screen explaining the D.O.T. Kangaroo and its contents. The screen informs the designer that he or she may subscribe to the entire D.O.T. Kangaroo, but that this is not suggested because the volume is quite large and may not be needed by anyone except a D.O.T. employee. The welcoming screen also lists different sections of the D.O.T. Kangaroo which may be subscribed to instead. The designer scrolls through this list and selects, using the mouse button, the list item named "Construction and Building Codes."

The window is now entitled "D.O.T. Construction and Building Codes," and has a welcoming screen explaining the signs, signals and lighting Kangaroo. The welcoming screen informs the designer that he or she may subscribe to the entire construction and building codes Kangaroo, but that this is not suggested, because the volume is quite large and may not be needed by anyone except a D.O.T. contractor. The welcoming screen then lists different sections of the Kangaroo which may be subscribed to instead. The designer scrolls through this list and selects, using the mouse button, the list item named "Signs, Signals, and Lighting."

The window is now entitled "D.O.T. Codes for Signs, Signals, and Lighting," and has a welcoming screen explaining the construction and building codes Kangaroo. The designer then goes to the pull-down Kangaroo menu at the top of the screen and selects "subscribe to" from the menu. A dialog box appears which tells the designer the name of the Kangaroo to which he or she is about to subscribe. From this dialog box, the designer can choose to subscribe to one of the higher level Kangaroos traversed in the search. For the purposes of this scenario, however, the designer does not need any additional databases, and so chooses the "OK" button.

The designer now has a subscription to the "D.O.T. Codes for Signs, Signals, and Lighting" Kangaroo. This subscription will keep itself up-to-date until the user unsubscribes.

After the designer clicks the "OK" button, an alert box appears on the designer's display screen that says "You have subscribed to a new Alternate Kangaroo. To use your new Kangaroo databases, close the current search window and select from your desk level resources palette. If you would like to subscribe to other databases from the current Alternate Kangaroo, continue navigating through the search window." Because, for the purposes of this scenario, the industrial designer does not need any additional databases from the Department of Transportation, the designer clicks "OK" to clear the alert box, and then the close box on the D.O.T. Codes for Signs, Signals, and Lighting" window. The designer is then back on the desk top and selects "D.O.T. Codes" from the "Resources" pop-up palette. Alternatively, the "Resources" pull-down menu at the top of the screen may be used.

A new window opens entitled "D.O.T. Codes for Signs, Signals, and Lighting." This window has four pop-up palettes entitled "Topics," "Requirements," "Issues," and "Resources." The designer selects "Street Lamps" from the "Topics" pop-up palette. The window is now entitled "Lighting" and has four pop-up palettes entitled "Types," "Requirements," "Issues," and "Resources." The designer selects "Tolerances" from the "Requirements" pop-up palette.

The designer now reads the minimum requirements for foot-pounds per square inch and minimum shear strength requirements for a street lamp. These specifications may be selected by the designer and dragged to the "notes" icon, where the selected text will be stored for later examination and/or printing. The designer then closes the "Lighting" window.

The designer is now back on the desktop and ready to begin searching materials. The designer selects the "Search All" icon to open a "Search All" dialog box. The designer then types in the name of a material, if known, including the physical requirements and any manufacturing restrictions known to the designer. Since the designer most typically only knows physical requirements, this may be all of the information that is entered.

The designer then selects "All" from the "Search Databases" pop-up menu and then clicks the "OK" button. The "Search All" dialog box disappears, and a "List-1" window opens. This list is the result of the designer having selected "Search All." Double-clicking the mouse button on one of the materials listed in "List-1" will open a search window from the databases of the material selected. In the present scenario, instead of selecting a material, the designer returns to the "Search All" icon, and reopens the dialog box. The designer then enters the physical requirements learned from the Department of Transportation codes databases and specifies that the material must be recycled. When the designer clicks the "OK" button, the "Search All" dialog box disappears and a window entitled "List-2" appears. The "List-2" list is substantially shorter than the list presented in "List-1," because of the further requirement that the material be made of recycled substances. For the purposes of this scenario, "List-2" contains four materials: aluminum, steel, polycarbonate plastic, and ABS plastic.

The designer then double-clicks the mouse button on "Aluminum" in the "List-2" window, and a new search window entitled "Recycled Aluminum" opens. The search window specifies "recycled" because this was one of the properties specified in the second "Search All" command; if the designer had double-clicked on "Aluminum" in the "List-1" window, a window entitled "Aluminum" would have appeared, representing the virgin or new aluminum database.

The "Recycled Aluminum" window has four pop-up palettes entitled "Grades," "Properties," "Concerns," and "Resources." The designer reads the contents of the window's scrolling text field which explains the history of aluminum recycling, and how aluminum recycling is accomplished. The designer, interested in the cost, may go to the "Resources" pop-up palette and select "Prices."

The window is now entitled "Recycled Aluminum Prices," and a scrolling text field presents the names, phone numbers and addresses of different providers of recycled aluminum, organized alphabetically by location, with their respective prices. The average U.S. price is shown to be $180 per ton.

The designer then clicks and holds the mouse button down on the "Full Record" icon at the top of the "Recycled Aluminum Prices" window and drags the icon on top of the "Notes" icon. This copies the full contents of the scrolling field in the current window into the designer's notes.

To determine what manufacturing processes can be used, the designer chooses to go back to the previous window to locate this information. To do this the designer holds the mouse button down on the title in the window's title bar, and a list of previous windows appears. The user releases the mouse button on the name of the previous window or "go back one . . . " menu option. The window is now entitled "Recycled Aluminum" and has the same pop-up palettes as before. In response to the designer selecting "Mfg. Processes" from the "Properties" pop-up palette, the window is now entitled "Recycled Aluminum Manufacturing Processes." The designer reads the scrolling text field and discovers that all conventional milling and machining techniques used for virgin or new aluminum can be used for recycled aluminum; no substantive mechanical or physical properties exist between the recycled and the virgin material.

To determine the reasons why people might choose to use virgin instead of recycled aluminum, the designer returns to the "Resources" pop-up palette and selects "Prices." The window is now entitled "Recycled Aluminum Prices." The designer then selects "Virgin Aluminum" from the "Grades" pop-up palette.

The window is now entitled "Aluminum Prices," and a scrolling text field containing the names, phone numbers and addresses of different recycled aluminum providers, organized alphabetically by location, with their respective prices is provided. The average U.S. price is $200 per ton.

To determine the basis for the difference in the pricing between recycled and virgin aluminum, the designer goes to the "Properties" palette and selects "Origins." The window is now entitled "Aluminum Origins," and has a scrolling text field. As the designer reads the contents of this window, he or she learns about the high cost of mining and refinement of Bauxite, one of the primary elements of aluminum.

To continue searching, the designer returns to the previous manufacturing window by holding the mouse button down on the title in the window's title bar to produce a list of previous windows. The designer releases the mouse button on "Recycled Aluminum Manufacturing Processes," causing the "Recycled Aluminum Manufacturing Processes" window to replace the "Aluminum Origins" window.

Based on this search and the completeness of the data provided using the present invention, the industrial designer may efficiently and responsibly make the decision to use recycled, rather than virgin, aluminum in order to minimize costs and any adverse environmental impact. The industrial designer may also, however, consider the other materials presented in the "List-2" window using the present invention.

To consider the other materials, the designer closes the current search window by clicking the close box or by selecting the "Close Search Window" from the "File" pull-down menu. The designer then double-clicks on the item entitled "Steel" in the "List-2" window and follows a pattern of exploration and note-taking throughout this search similar to the search pattern used in the search of aluminum. The materials entitled "Polycarbonate Plastic" and "ABS Plastic" may also be searched in the same manner.

By the end of these searches the designer will have determined that ABS Plastic will meet the needs of the solar-powered street lamp the best but that, unfortunately, the supply of recycled ABS plastic is too low to meet the needs of full production of 1000 or more lamps. Accordingly, the designer's decision to use recycled aluminum may be virtually final. The recycled aluminum materials and manufacturing costs will be under 105 dollars per lamp according to the informal estimates, received from five manufacturers in the Eastern United States, obtained during the search.

In addition to providing an efficient and timely research tool, the present invention also provides an effective means of presenting the designer's research findings to a client or sponsor for approval.

To prepare such a presentation, the designer selects "Print" from the "File" menu at the top of the screen, to open a printing set-up dialog box. From here the designer selects, through a series of checkboxes, desired documentation for printing. For the purposes of this scenario, the designer checks the box labeled "Complete report of each window from the Session." The "Pages" indicator shows that the document to be printed is 43 pages long. To assist the client in navigating the report, the designer checks off the box labeled "Outline," which will limit the print-out to just the names of each search and subsequent window. The "Pages" indicator now shows that the document to be printed is only 2 pages longer. The designer then clicks the "Print" button to begin printing.

The designer may also want to review and print out a copy of the notes taken during the search for his or her own records. To do so, the designer clicks the mouse button on "Notes" from the "Kangaroo" pull-down menu. A window entitled "untitled Kangaroo Session notes" appears with a scrolling text field. The designer reads through the notes, edits out any unnecessary information, and adds comments where appropriate. The designer then goes to the "File" pull-down menu and selects "Print . . . " checks the box labeled "Notes," and then clicks "O.K."

The search and documentation now complete, the designer quits using Kangaroo by going to the "File" pull-down menu and selecting "Quit." An alert box appears with the message "This Kangaroo Session has not been saved, and will not be able to be recalled if it is not saved. Would you like to save it now?" Clicking the mouse button on the "Save" button produces a standard file save dialog box, into which the designer enters a name under which the session is to be saved, followed by clicking the "O.K." button. The file is saved, and Kangaroo Quits. Scenario #2—Library Parent Kangaroo In the second scenario, a typical public library serves as the Parent Kangaroo. The primary purpose of the public library system is to provide access to books and other information for members of the public generally. The library administration wants to take part in programs that will help the library to be a valuable resource to the community, by fostering educational and intellectual growth. Because of the already established infrastructure and lending mechanisms associated with the public library system, the public library system provides ideal setup sites for the Kangaroo network of the present invention.

The first need of the library is to organize and provide access to the library's own collection, with the second need being to organize and establish the access mechanism to other resources. Budgetary concerns are an ongoing obstacle to the further development of most libraries and must be taken into consideration.

For this scenario the Kangaroo configuration comprises one Parent Kangaroo or server, organized in the library format, and several Joey or client stations, the number to be determined appropriate to the average number of library users.

The library must first configure the Parent Kangaroo by registering the Parent Kangaroo as a server with the Kangaroo network. When registering, the library provides its zip code and modem phone number so that the network can locate the library. The library is then assigned a Parent Kangaroo access number, which will serve as the library's Kangaroo network identity.

The subscribing library enters its name as it will appear on the network, e.g., Anytown, N.Y., PL#2, which stands for public library number 2 in Anytown, New York. If the library were a State University, the identity would be the university acronym, N.Y.S.U.A. for New York State University at Anytown, and library number, resulting in N.Y.S.U.A.#1.

As the next step, the library selects an organizational format from the Parent Kangaroo configurations. Because it is a library, the standard "Library" format would most likely be selected. Using the "Library" format, the top level pop-up palettes include "Subject," "Author," and "Title." Unless specified otherwise, the contents of each palette include an A–Z categorization.

The library then enters the contents of its current collection. This can be done by entering manually or, since most libraries already have their collections in a database format, the library can import the information. After the information has been imported, the Parent Kangaroo will also need to know the general contents or subject of each entry so that the Kangaroo can cross reference to other entries. If the previous database has related subjects listed for each entry in the databases this may be accomplished from the import mechanism.

The next step is to register the library's Joeys. These Joeys are locked by the parent, meaning that they will not be able to select a different default Parent Kangaroo or store any downloaded information beyond the Joey's rewritable buffer. (The rewritable buffer stores any information downloaded but will replace stored information once the buffer has been filled. For a dedicated Joey station, the limit to the buffer is the capacity of the hard drive.) The locked Joeys will still be able to subscribe to Alternate Kangaroos with library approval.

At this point, the library Kangaroo system is fully functioning. The Parent Kangaroo begins receiving information from any Alternate Kangaroos to which it has subscribed. Such Alternate Kangaroos may include the Library of Congress or the Smithsonian Institution. If the Parent Kangaroo subscribes to the Library of Congress, the Parent Kangaroo will receive the digital version of each of the books the Library of Congress has in its collection, so that the books may be viewed and referenced from each Joey station. If the Parent Kangaroo subscribes to the Smithsonian Institute, the Parent Kangaroo will begin receiving scanned images of the Smithsonian collections and databases. As this process could take a long time and take up a large amount of storage at each site, the Parent Kangaroo can limit the detail or depth of each subscription, so that only the top level or levels of each subscription may be transferred; each time a Joey accesses beyond those points, the information would be downloaded from the Alternate Kangaroo to the using Joey.

Through the network of the present invention, the library is able to provide the library users, with minimal effort and cost, access to almost endless information, and can afford to spend more time and effort on community projects, knowing that the library's current collection is accessible to people at the library and anywhere in the world. The library will save space and money, subscribing to book depositories and magazines and newspapers via the Kangaroo network, and obviating the need to store the physical copies. As opposed to being subject to the traditional restrictions of building size, and budget limits, the library equipped with the network of the present invention is primarily limited by its digital storage capability.

Scenario #3—XYZ Plastics Inc.

As a third scenario, a company, XYZ Plastics Inc., needs to provide customers and potential customers with information about various products and plastic resins. XYZ Plastics Inc. (XYZ) has a large Research and Development division that is constantly modifying and creating new resins. Distribution of printed information is cost-prohibitive, due to the constantly changing nature of the information. XYZ Plastics has a large reference library and many research associates devoted to gathering information about products from competing companies and other related chemical industry sources of information. This reference library has had exponentially increasing costs due to rapid advances in the industry.

The XYZ Plastics company has two Parent Kangaroos. One is dedicated to in-house use only, meaning it is not connected to a phone line. This dedicated Parent Kangaroo stores the company's proprietary information, and has different levels of security. The second Parent Kangaroo is connected to a phone line and holds product information, press releases and databases for public access; the second Parent Kangaroo also acts as a gateway for employees to research Alternate Kangaroos outside the company. Both Parent Kangaroos are set up in a slightly modified Materials Format. XYZ Plastics has 386 Joeys, for 515 employees, connected to both Parent Kangaroos.

XYZ Plastics must first configure their Parent Kangaroos by registering the Parent Kangaroos as servers with the Kangaroo network. When registering, XYZ Plastics provides its zip code and modem phone number so that the network can locate the XYZ Plastics Kangaroo; the company only provides this information for one of its Parent Kangaroos, since the dedicated in-house Kangaroo will not be connected to a phone line for outside access. XYZ Plastics is then assigned a Parent Kangaroo access number, which will serve as the company's Kangaroo network identity.

XYZ Plastics then enters its name as it will appear on the network. After entering "XYZ Plastics" the company selects an organizational format from the Parent configurations. Because XYZ Plastics is a plastics manufacturer, XYZ Plastics selects the standard "Materials" format. Using this format, the top level pop-up palettes include "Materials," "Properties," and "Concerns"; XYZ Plastics can change the "Concerns" palette to be the "Pricing" palette. Unless specified otherwise, the contents of each palette are an A–Z categorization.

XYZ Plastics then enters the contents of its existing databases. This can be done by entering manually or, since XYZ Plastics already has its databases in another format, XYZ Plastics just imports the information. After the information has been imported, the Parent Kangaroo will also need to know the general contents or subject of each entry, so that the Kangaroo can cross reference to other entries. If the previous database has related subjects listed for each entry in the databases, this may be accomplished from the import mechanism.

The next step is to register the company Joeys. These Joeys will be partially locked by the Parent Kangaroo, meaning that they will not be able to upload any information to the public Parent Kangaroo, or to an Alternate Kangaroo. The partially locked Joeys will, however, still be able to subscribe to Alternate Kangaroos.

At this point, XYZ Plastics' Kangaroos are fully functioning. The public Parent Kangaroo begins receiving information from any Alternate Kangaroos to which it has subscribed. If one of these Alternate Kangaroos is the Society of Plastics Engineers, for example, XYZ begins receiving all of the databases located at the S.P.E. Kangaroo. If the company subscribes to G.E. Plastics, the public Kangaroo begins receiving all of the databases located at the G.E. Plastics Public Kangaroo.

Using the present invention, XYZ Plastics is able to provide current accurate information about all of its products to any potential customers, and is also able to receive feedback from those potential customers. The network of the present invention also provides a way for XYZ Plastics' internal documents and research to be organized and accessed by XYZ Plastics employees. The research being done at the company is more efficient, and thus more cost effective, because the employees can conduct research on almost any topic from their desk, or in the laboratory.

Scenario #4—Simple Subscription Description

As a fourth scenario, a subscriber to a magazine wants to receive the magazine every month on time. The magazine publisher wants to reduce the overhead costs and environmental impact of its publishing, while still retaining the quality of the magazine.

To meet the needs of both the subscriber and the publisher, the subscriber receives a free version of the Joey or client software allowing the subscriber to receive not only the subject magazine, but also any other magazine, as released, directly to the subscriber's home or office computer, without any effort, or lost work time. The Joey may also access other services using a Kangaroo, such as libraries, schools, newspapers, T.V. shows (when technology allows), etc.

In this scenario, the publisher becomes a Parent Kangaroo or server and provides subscribers with an electronic version of the publisher's magazines. Because every page of a magazine is laid out on a publisher's computer, when the magazine is ready to print it is simply added to the publisher's Parent Kangaroo file list, and the publishing is complete—with an overhead cost savings of approximately 70%. These cost savings could be passed directly to the subscribers, devoted to the content of the magazine, or both. Kangaroo publishing may also be used to substantially reduce the environmental impact of publishing, and allow electronic searching and cross referencing of magazine articles with back issues and with other magazine articles on related topics.

Automatic Dissemination of New or Updated Modules and/or Module Blocks

Now that an update procedure between a host terminal and a user terminal has been described both in terms of implementation and application under various scenarios, a procedure for updating information distributed across a large number of terminals will be described. Returning to FIG. 1, a representative network structure 24 over which information is automatically disseminated is shown. As noted above, a plurality of user terminals called Joeys 10, 11, and 12, host terminals called Parent Kangaroos 13 and 15, and alternate host terminals called Alternate Kangaroos 14, 16, 17 and 18 are interconnected via a number of communication channels 20, 21, 22 and 23. The communication channels can be formed of various coupling media such as glass or plastic fiber optic cables, coaxial cables, twisted wire or pair cables, ribbon cables or a combination thereof. In addition, one of ordinary skill in the art will appreciate that the coupling medium can also include a radio frequency coupling media or other intangible coupling media.

In the actual embodiment of the present invention described herein, the Kangaroos, Alternate Kangaroos and Joeys shown in FIG. 1 are distributed across an internetwork. Those of ordinary skill in the network arts will appreciate that the present invention may be applied to the Internet, WANs, LANs, remote access services, a point-to-point connection or any other configuration of interconnected devices. In addition, it will be appreciated that the present invention can also be applied to a distributed system of memory and processing devices interconnected via a network or via a bus or similar communication medium within a stand alone computer or terminal.

As shown in FIG. 1, the network structure 24 connects a plurality of Joeys, Parent Kangaroos and Alternate Kangaroos. A Joey can essentially be equated with a user of "client" terminal or computer, while a Parent Kangaroo is essentially a host or "server" terminal or computer. An Alternate Kangaroo is a hybrid user/host or client/server terminal. For purposes of describing the information distribution program of the present invention, the differences between the Joeys, Parent Kangaroos and Alternate Kangaroos on both a hardware and software level are virtually immaterial. Information is distributed to these terminals in the exact same manner regardless of whether the terminal is a Joey, Parent Kangaroo or Alternate Kangaroo. Therefore, for purposes of describing the following aspects of the present invention, all terminals connected to the network structure shown in FIG. 1 will hereinafter be referred to as "Kangaroos" 15.

As will be described in more detail below, the present invention is method and apparatus for automatically disseminating information generated by any one of the Kangaroos 15 to any and all of the Kangaroos 15 connected to the network structure 24 who are interested in the information.

Relevant Kangaroo Components

Figure 13:
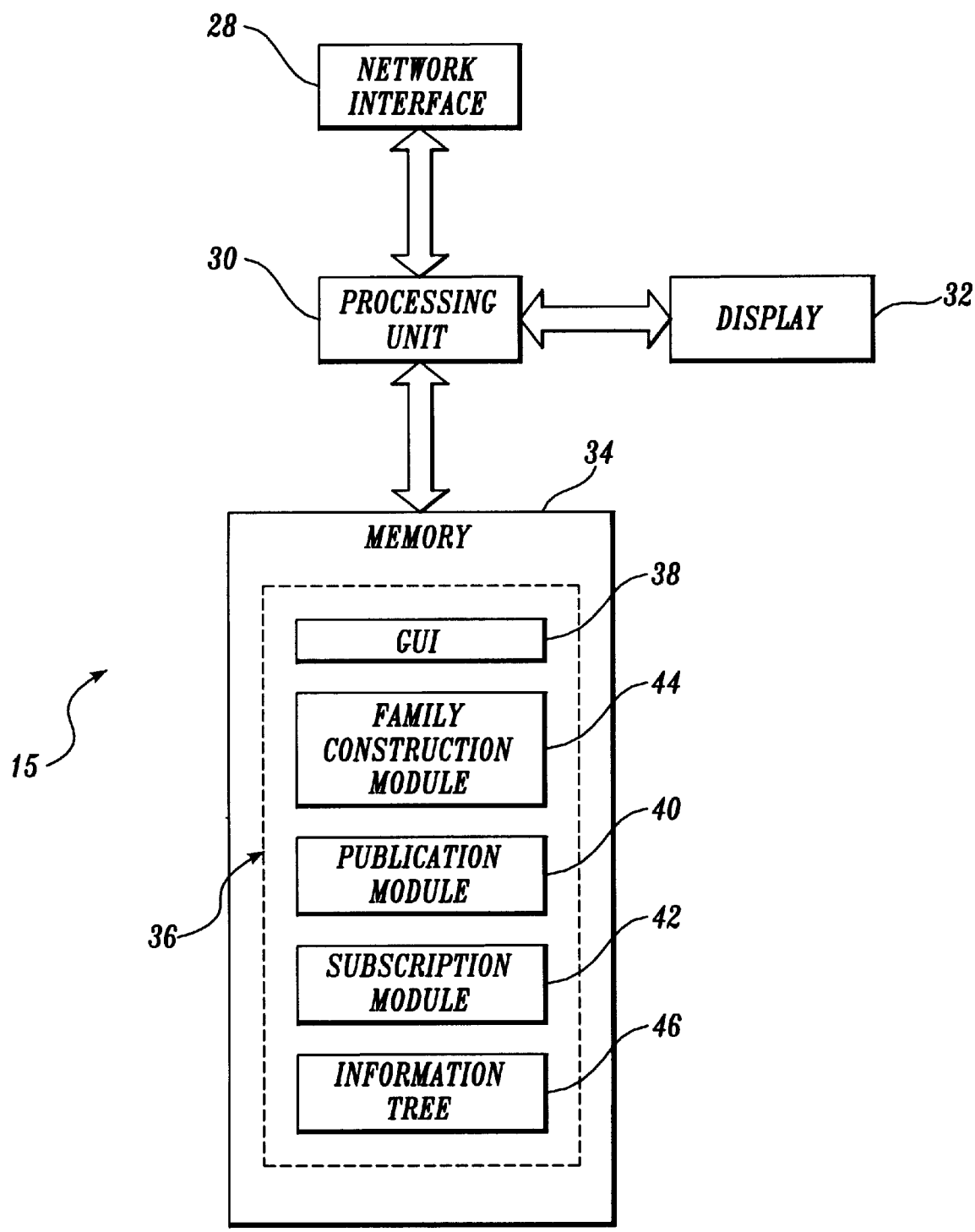
FIG. 13 is a schematic block diagram of a typical terminal connected to the network structure shown in FIG. 1 that can be used to receive and disseminate information according to the present invention.

FIG. 13 depicts several of the key components of a Kangaroo 15. It will be appreciated by those of ordinary skill in the art that the Kangaroo 15 includes many more components than those shown in FIG. 13. However, it is not necessary that all of these generally conventional components be shown in order to disclose an actual embodiment for practicing the present invention. As shown in FIG. 13, the Kangaroo 15 is connected to the network structure 24 via a network interface 28. Those of ordinary skill in the art will appreciate that the network interface 28 includes the necessary circuitry for connecting the Kangaroo 15 to the network structure 24 and a communication medium of a particular communication channel 20, 21, 22 or 23.

The Kangaroo 15 also includes a processing unit 30, a display 32 and a memory 34. The memory 34 generally comprises a random access memory (RAM), a read-only memory (ROM), and permanent storage device such as a hard disk drive, floppy disk drive, etc. If the Kangaroo 15 is a client computer, the permanent storage device may further include a tape drive, optical drive, etc. The memory 34 stores the program code and data necessary for automatically disseminating information over the network structure in accordance with the present invention. More specifically, the memory 34 stores an information distribution program 36 formed in accordance with the present invention for automatically distributing information over the network structure 24. As will be described in more detail below, the information distribution program 36 comprises a graphical user interface (GUI) 38, a family construction module 44, a publication module 40, a subscription module 42, and an information tree 46. The information tree 46 is comprised of modules 52 and module blocks 54, which store the most recent information available to the Kangaroo 15 and perhaps, previous versions of the information. It will be appreciated that if the information distribution program 36 of the present invention is installed on a Kangaroo 15 which is not equipped with the display 32, their is no need for the GUI 38.

The GUI 38 is a display format that enables operators of the Kangaroo 15 to choose commands, start programs, and subscribe to information available throughout the network structure 24 by pointing to pictorial representations and lists of menu items on the display 32 using a computer input device, such as a mouse or keyboard.

The family construction module 44 is the component of the information distribution program 36 that organizes the various Kangaroos 15 connected to the network structure 24 into families of Kangaroos 15, i.e., groups of related terminals. As with a traditional family, each Kangaroo 15 connected to the network structure 24 has at least one immediate family, i.e., a group of Kangaroos directly known by and related to it. A Kangaroo 15 may also have at least one extended family, i.e., a group of Kangaroos directly known by and related to the immediate family members of the original Kangaroo. The construction of these families in accordance with the family construction module 44 will be described in more detail below.

The publication module 40 is the component of the information distribution program 36 that automatically distributes, "publishes" or "pushes" information to the immediate and extended family members of a Kangaroo 15 which have shown an interest in the information. In addition, the publication module 40 compensates for faults in the distribution path of the information, e.g., failure of a Kangaroo, by passing on updated or new information directly to the immediate family of the failed Kangaroo, i.e., the extended family members of the originating Kangaroo.

The subscription module 42 is the component of the information distribution program 36 that provides a Kangaroo 15 with the ability to show interest in or "subscribe" to information located on the Kangaroos 15 connected to the network structure 24. Like the publication module 40, the subscription module 44 also provides for fault tolerance.

Figure 14:
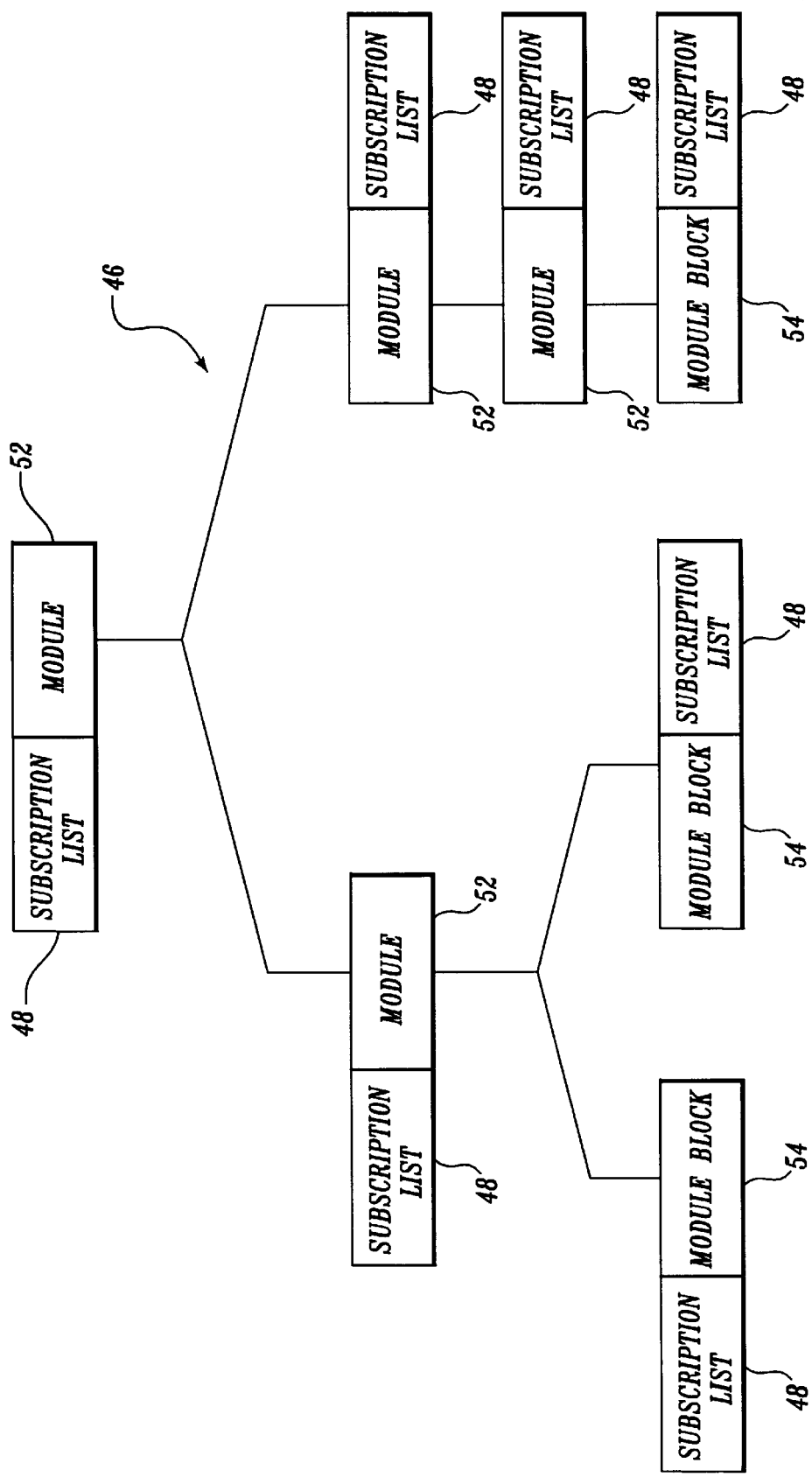
FIG. 14 is a diagram of a hierarchical data structure in which information disseminated over the network structure shown in FIG. 1 may be stored according to the present invention.

Finally, the information distribution program 36 stored in memory 34 of the Kangaroo 15 includes an information tree 46 as is shown in FIG. 14 for storing the information available to the Kangaroo 15 and the identity of those Kangaroos 15 that have shown an interest in the information. The root of the information tree 46 is a module 52 that represents all of the information in the information tree 46. The child nodes of the root module may comprise other modules 52 or module blocks 54 of information. Whenever the Kangaroo receives updated information, the appropriate module 52 or module block 54 in the information tree 46 is updated. For example, if a changed module or a module block is received, the corresponding module or module block in the information tree is replaced with the changed module or module block. If new information is provided to the Kangaroo 15, then a new module 52 or module block 54 will be added to the information tree 46. Those of ordinary skill in the art will recognize that there are various, well-known techniques and methods for building, searching and navigating tree data structures. Therefore, a detailed discussion of such techniques is not necessary for disclosing an actual embodiment for practicing the present invention. It will further be appreciated that a module may comprise a plurality of module blocks and that a module may also comprise a module block of another module. In other words, modules and module blocks can be nested.

In the illustrated embodiment of the present invention, each module 52 and module block 54 in the information tree 46 is associated with a subscription list 48. Each subscription list 48 contains the names and network addresses of those Kangaroos 15 connected to the network structure 24 who have shown an interest in or subscribed to the information stored in the associated module 52 or module block 54. As will be described in more detail below, whenever a Kangaroo 15 subscribes to a module 52 or module block 54, the name and network address of that Kangaroo is added to the subscription list 48 for the module 52 or module block 54.

The Information Distribution Program

Building the Kangaroo Family

Figure 15:
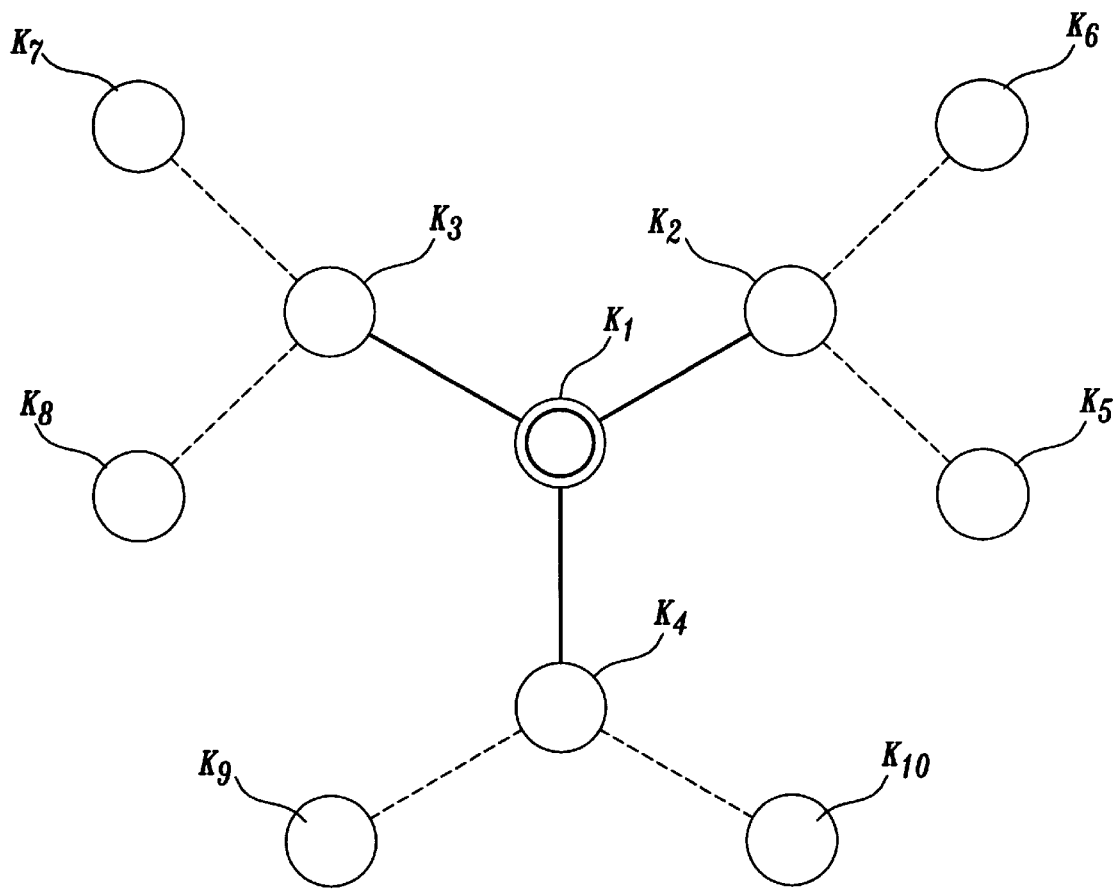
FIG. 15 is a block diagram illustrating a network structure organized into families of terminals.

FIG. 15 is a block diagram illustrating a network structure organized into families of interconnected Kangaroos 15 in accordance with the family construction module 44 of the information distribution program 36 of the present invention. Those of ordinary skill in the art will appreciate that the connections shown between Kangaroos are not actual electronic connections. Rather, the lines connecting the Kangaroos represent logical family connections between devices that are created according to the family construction module 44. It will be appreciated that the Kangaroos shown in FIG. 15 may actually be dispersed over a LAN, WAN and/or the Internet.

Creation of a Kangaroo family is predicated on the existence of at least one Kangaroo. As will be discussed below, families are constructed by first building the immediate family of a Kangaroo and then building the extended families of the Kangaroo at a level once removed, twice removed, thrice removed, and so on from the Kangaroo, up to a level $n^{th}$ removed from the Kangaroo. For example, in the actual embodiment of the present invention shown in FIG. 15, $K_1$'s immediate family consists of $K_2$, $K_3$ and $K_4$, while $K_1$'s extended families consist of $K_5$ and $K_6$ (related via $K_2$), $K_7$ and $K_8$ (related via $K_3$), and $K_9$ and $K_{10}$ (related via $K_4$).

As yet another aspect of the present invention, the immediate and extended families of a Kangaroo can overlap. For example, $K_5$ illustrated in FIG. 15 can join $K_2$'s immediate family as well as $K_{10}$'s immediate family. As a result, $K_2$'s immediate family consisting of $K_1$, $K_5$ and $K_6$ overlaps $K_{10}$'s immediate family consisting of $K_4$ and $K_5$; and $K_1$'s extended family consisting of $K_5$, $K_{10}$ and $K_6$ overlaps $K_1$'s extended family consisting of $K_9$, and $K_{10}$ and $K_5$.

In other embodiments of the present invention, more than one immediate family can be constructed for a Kangaroo.

For example, $K_1$ could be a member of an immediate family entirely separate from $K_2$, $K_3$ and $K_4$. In other words, rather than adding Kangaroos to $K_1$'s extended family, Kangaroos are added to multiple immediate families of $K_1$. The multiple immediate families may, in turn, have extended families of their own up to a level $n^{th}$ removed from $K_1$. In addition, the multiple immediate families and their extended families may overlap with each other or with $K_1$'s original immediate family. The ultimate result of such overlap and layering essentially creates a "mob" of Kangaroos throughout which information can be automatically and virtually instantaneously propagated as will be described in more detail below.

Figure 16:
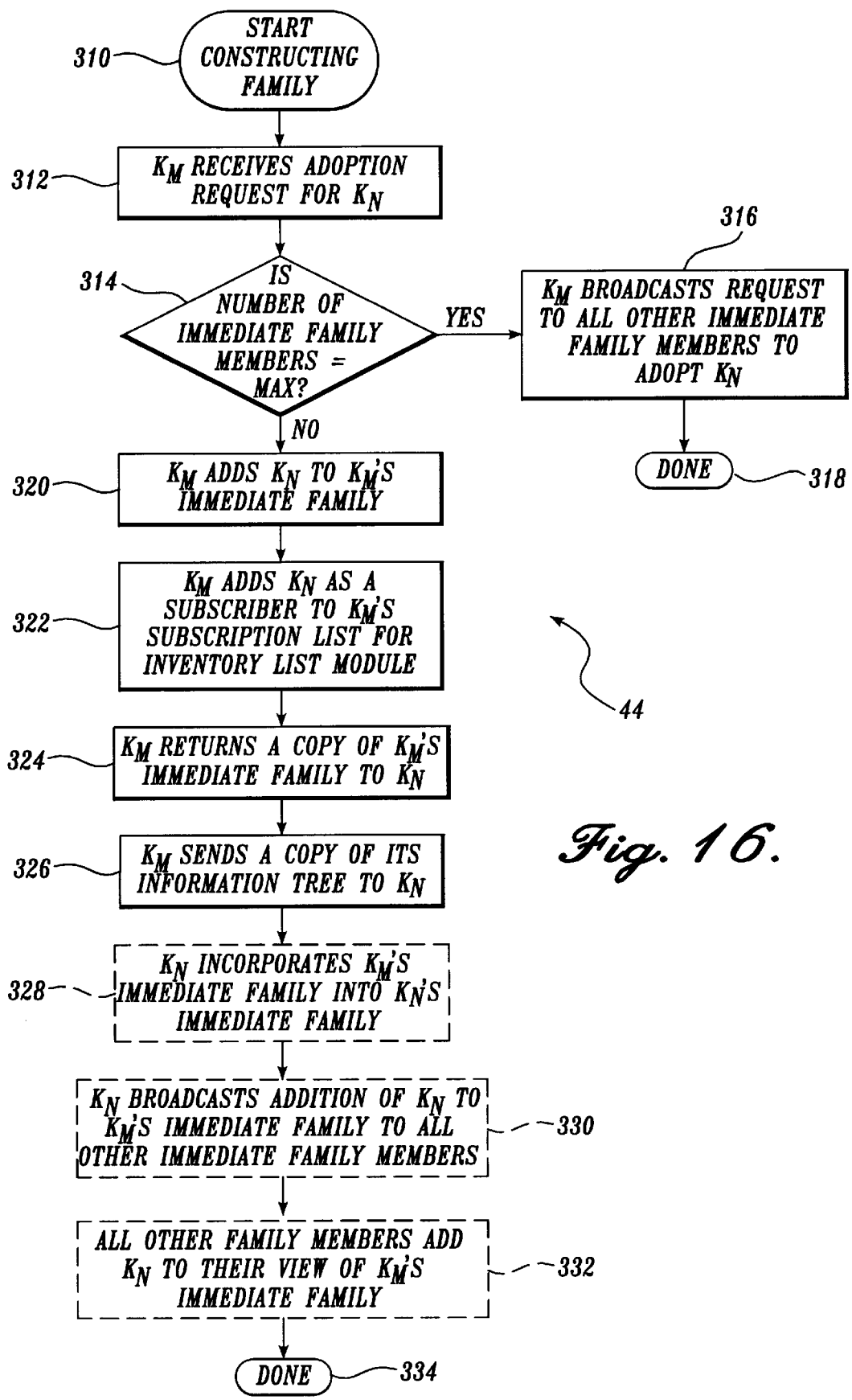
FIG. 16 is a flow chart illustrating the logic used to construct a family of terminals such as that shown in FIG. 15.

The logic used by the information distribution program 36 for building the above-described and illustrated immediate and extended families is shown in FIG. 16. Families are constructed by first building the immediate family (or families) and then building the extended families. The logic shown in FIG. 16 is predicated on the fact that at least one Kangaroo ($K_M$) already exists and is installed with the information distribution program 36. The logic in FIG. 16 begins in a block 310 and proceeds to a block 312 where Kangaroo $K_M$ receives an adoption request for another Kangaroo $K_N$. It will be appreciated that $K_M$ may receive the adoption request directly from $K_N$, or from a related Kangaroo in one of its immediate or extended families who received the adoption request directly from $K_N$, but could not add $K_N$ to its own immediate family.

When $K_M$ receives an adoption request, $K_M$ does not immediately add $K_N$ to its immediate family. Rather, $K_M$ first determines whether it has room in its immediate family. Although an immediate family of Kangaroos could theoretically be infinitely large, in practicality, different Kangaroos can only support interactions with a finite number of other Kangaroos due to limitations in processor, information quantity and information frequency parameters. Consequently, it is necessary to optimize the size of any Kangaroo's immediate and extended families to a maximum family size. In the illustrated embodiment of the present invention, the maximum family size for each Kangaroo is set to an arbitrary positive number, i.e., four, by an administrator of the Kangaroo upon installation of the information distribution program 36. However, those of ordinary skill in the art will appreciate that the maximum family size can be set in a number of ways, e.g., by a random number generator, as a predefined parameter of the information distribution program 36, or as a function of processor, information quantity and information frequency parameters. Further, it will be appreciated that the maximum family size can be changed or modified on the fly as circumstances, perhaps including the processor, information quantity and information frequency parameters, change.

Returning to block 312, after $K_M$ receives an adoption request for $K_N$, the logic determines in a decision block 314 if the number of family members in $K_M$'s immediate family has already reached the maximum family size. If not, there is room for $K_N$ to join $K_M$'s immediate family. Consequently, the logic proceeds to a block 320 in which $K_M$ adds $K_N$ to $K_M$'s view of its immediate family, i.e., $K_M$ adds the name and network address of $K_N$ to a relational list of $K_M$'s immediate family members. Next in a block 322, $K_M$ adds $K_N$ as a subscriber to the subscription list 48 of the module 52 that stores an inventory listing all of the modules 52 available in $K_M$'s information tree 46. In other words, $K_N$ automatically subscribes to $K_M$'s inventory module upon addition to $K_N$'s immediate family so that $K_N$ can immediately begin receiving updates to the inventory of information available to its immediate family.

After $K_M$ has added $K_N$ to its view of its immediate family and to its subscription list for its inventory module, $K_M$ returns a copy of its immediate family to $K_N$ in a block 324 so that $K_N$ may incorporate $K_M$'s view of its immediate family into $K_N$'s immediate family. Next, in a block 326, $K_M$ sends $K_N$ a copy of its own information tree 46 under the assumption that $K_N$ has no information of its own.

Once $K_N$ has received a copy of $K_M$'s immediate family and information tree 46, $K_N$ incorporates $K_M$'s view of its immediate family (including names and network addresses) into its own in a block 328. More specifically, $K_N$ adds $K_M$ to $K_N$'s immediate family and adds $K_M$'s remaining immediate family members to $K_N$'s view of its extended family related to it via $K_M$. Next in a block 330, $K_N$ broadcasts the addition of itself to $K_M$'s immediate family to all other immediate family members of $K_M$. Those of ordinary skill in the art will appreciate that if $K_M$ has no other immediate family members, $K_N$ shall not broadcast the addition of itself to $K_M$'s immediate family. However, if $K_M$ does have other family members, the remaining immediate family members will add $K_N$ (including $K_N$'s name and network address) to their view of $K_M$'s immediate family in a block 332 upon receipt of $K_N$'s broadcast. In other words, each of the remaining immediate family members will add $K_N$ to their own extended family related via $K_M$. The logic then ends in a block 334.

Now that the process for adding a Kangaroo ($K_N$) to the immediate family of another Kangaroo ($K_M$) has been described, an illustrative example will be given. Returning to FIG. 15, it is presumed for purposes of illustration that the maximum family size is four, and that $K_2$ and $K_3$ have already been added to the immediate family of $K_1$. Therefore, $K_1$'s view of its immediate family (i.e, its relational list) is:

$$K_1(K_2K_3).$$

When $K_4$ sends an adoption request to $K_1$, $K_4$ will be allowed to join $K_1$'s immediate family because the size of $K_1$'s immediate family (three) is less than the maximum immediate family size (four). Consequently, $K_1$ will add $K_4$ to its immediate family in block 320 as follows:

$$K_1(K_2K_3K_4).$$

$K_1$ then returns a copy of its immediate family to $K_4$ so that $K_4$ may incorporate $K_1$'s view of its immediate family into $K_4$'s own immediate family in block 328 as follows:

$$K_4(K_4(K_1(K_2K_3))).$$

$K_4$ then broadcasts its addition to $K_1$'s immediate family to the other remaining immediate family members of $K_1$ in block 330, i.e., to those Kangaroos who where members of $K_1$'s immediate family before $K_4$ was added. $K_2$ and $K_3$, then add $K_4$ to their view of $K_1$'s immediate family, i.e., to their own extended families related via $_1$ in block 332 as follows:

$$K_2(K_2(K_1(K_3K_4))$$

$$K_3(K_3(K_1(K_2K_4))).$$

In the illustrated embodiment of the present invention, the next adoption request to be received by $K_1$ will be refused because $K_1$'s maximum family size (four) has been reached. Returning to decision block 314 of the family construction module 44, if an adoption request is received for $K_N$ by $K_M$, but $K_M$ does not have any room in its immediate family for $K_N$, $K_N$ will instead be added to $K_M$'s extended family. Hence, the logic proceeds to a block 316 where $K_M$ broadcasts a request to all of its immediate family members to adopt $K_N$. It will be appreciated that upon receipt of the request to adopt $K_N$, each of the family members will each determine whether or not they have room in their immediate families (i.e., $K_M$'s extended families) to adopt $K_N$ by performing the same logic shown in FIG. 16. Thus, the first family member Kangaroo capable of adding $K_N$ to its immediate family will do so. As a result, $K_N$ will be added to the extended family of the Kangaroo who passed on the adoption request.

In an alternative embodiment of the present invention, if there is no room in $K_M$'s immediate family for $K_N$, $K_N$ is added to another immediate family of $K_M$ instead of $K_M$'s extended family. In other words, a second immediate family is constructed for $K_M$. Conceptually, an $n^{th}$ number of immediate families for $K_M$ can be constructed. However, those of ordinary skill in the art will recognize that in practicality an upper limit is placed on the number of immediate families that can be constructed for one Kangaroo. In this alternative embodiment of the present invention, the logic shown in FIG. 16 would remain essentially the same except that $K_M$ is instructed to generate a new immediate family in block 316, rather than pass on the adoption request to its immediate family members. A new immediate family is then constructed in accordance with the family construction module 44. Each of $K_M$'s immediate families may, in turn, construct extended families of their own up to a level $n^{th}$ removed from $K_M$ in accordance with the family construction module 44. In addition, each of $K_M$'s immediate families and their extended families may overlap with each other or with $K_M$'s original immediate family by making a request to be adopted by those families and processing those adoption requests according to the family construction module 44.

Now that the process for adding a Kangaroo ($K_M$) to the extended family or one of the multiple immediate families of another Kangaroo ($K_N$) when the maximum family size is reached has been described, an illustrative example will be given. Returning to FIG. 15, it is presumed for purposes of illustration that the maximum family size is four, and that $K_2$, $K_3$ and $K_4$ have already been added to the immediate family of $K_1$. $K_1$'s view of its immediate family is:

$K_1(K_2K_3K_4)$.

However, the size of $K_1$'s immediate family has reached maximum family size. Hence, when $K_5$ sends an adoption request to $K_1$, $K_5$ is not allowed to join $K_1$'s immediate family. Instead, $K_5$ is added to $K_1$'s extended family. First, $K_1$ broadcasts a request to all members of its immediate family to adopt $K_5$ in block 316. $K_2$ is the first to process the request and add $K_5$ to its immediate family in accordance with the family construction module 44. Therefore, in accordance with the logic shown in FIG. 16, $K_5$ is added to $K_2$'s immediate family in block 320 as follows:

$K_2(K_1K_5)$.

$K_5$ eventually incorporates $K_2$ into its immediate family in block 328 as follows:

$K_5(K_2(K_1(K_3K_4)))$.

In block 330, $K_5$ broadcasts a message to $K_2$'s immediate family (i.e., $K_1$) that $K_5$ has been added to $K_2$'s immediate family. Finally, in block 332, $K_1$ adds $K_5$ to $K_1$'s view of it's extended family as follows:

$K_1(K_2(K_5)K_3K_4))$.

The logic then ends in block 334.

The Publication Module

Now that the construction of families has been described in more detail, the manner in which new and/or changed information is automatically distributed or published throughout those families will be discussed.

In accordance with the present invention, information can be distributed along paths depicted in FIG. 15 by bold and dotted lines from the perspective of a local Kangaroo ($K_1$) that originates the distribution of information over the network structure 24. As will be described in more detail below, $K_1$ first distributes information to its immediate family members (connected by bold lines) consisting of $K_2$, $K_3$ and $K_4$. In turn, each member Kangaroo of the immediate family passes on the information to its immediate family members, i.e., the extended family members of the $K_1$ (connected by dotted lines) More specifically, $K_2$ disseminates the information to $K_5$ and $K_6$; $K_3$ disseminates the information to $K_7$ and $K_8$; and $K_4$ disseminates the information to $K_9$ and $K_{10}$. In the illustrated example, it will be appreciated that each of the immediate and extended family members of $K_1$ are interested in the information being distributed by $K_1$. However, if only a subset of the immediate and extended family members have subscribed to the information, the information will be disseminated only to that subset of Kangaroos.

As more Kangaroos ($K_N$) request adoption by $K_1$, additional extended families are created at a level twice removed, thrice removed, and so on from the initial Kangaroo $K_1$, up to a level $n^{th}$ removed from $K_1$. Thus, information originally disseminated by $K_1$ is automatically propagated throughout the network structure 24 from the originating Kangaroo to the immediate family, the extended family once removed, and eventually to an extended family at a level $n^{th}$ removed. If additional immediate families are constructed for $K_1$, information is similarly automatically propagated from $K_1$ through these families and any extended families constructed from them.

Further, as immediate and extended families of a Kangaroo overlap, the propagation of information throughout the network structure 24 becomes virtually instantaneous and fault tolerant. For example, if $K_5$ illustrated in FIG. 15 joins $K_2$'s immediate family as well as $K_{10}$'s immediate family, $K_2$'s immediate family, i.e., $(K_1K_5K_6)$, will overlap $K_{10}$'s immediate family, i.e., $(K_4K_5K_9)$; and $K_1$'s extended family related via $K_2$, i.e., $K_5(K_{10})K_6$, will overlap another of $K_1$'s extended families related via $K_4$, i.e., $K_9K_{10}(K_5)$. Due to this overlap, any information distributed by $K_1$ is redundantly distributed to $K_{10}$ via $K_4$ and via $K_2$ and $K_5$. However, such redundancy is desirable from a fault tolerance perspective, i.e., if $K_2$ fails, $K_{10}$ will still receive the information distributed by $K_1$ via $K_4$. Such redundancy and overlap also reduces bandwidth, i.e., the rate at which the information is distributed, because the information is transmitted via more than one nondedicated path (as opposed to a single dedicated path in the case of a traditional client/server architecture or a plurality of dedicated paths in the case of a cluster architecture), and one of the distributions paths will likely present a shorter route for the information. For example, $K_1$, $K_4$, $K_{10}$ is shorter than $K_1$, $K_2$, $K_5$, $K_{10}$, and thus, $K_{10}$ will receive information from $K_1$ more quickly and efficiently via the former path.

Since more than one immediate family can be constructed for a Kangaroo, the virtually instantaneous, fault tolerant and bandwidth efficient propagation of information throughout the network structure 24 is yet be further enhanced. For example, if $K_1$ is a member of multiple immediate families, $K_1$ will disseminate information to each immediate family simultaneously. Each immediate family will then propagate the information to its immediate family members and so on until the information has been propagated throughout the entire network structure 24. It will be appreciated that if the multiple immediate families and their extended families overlap with each other or with $K_1$'s original immediate family, the redundancy and thus, fault tolerance and bandwidth efficiency, will improve even more.

Figure 17:
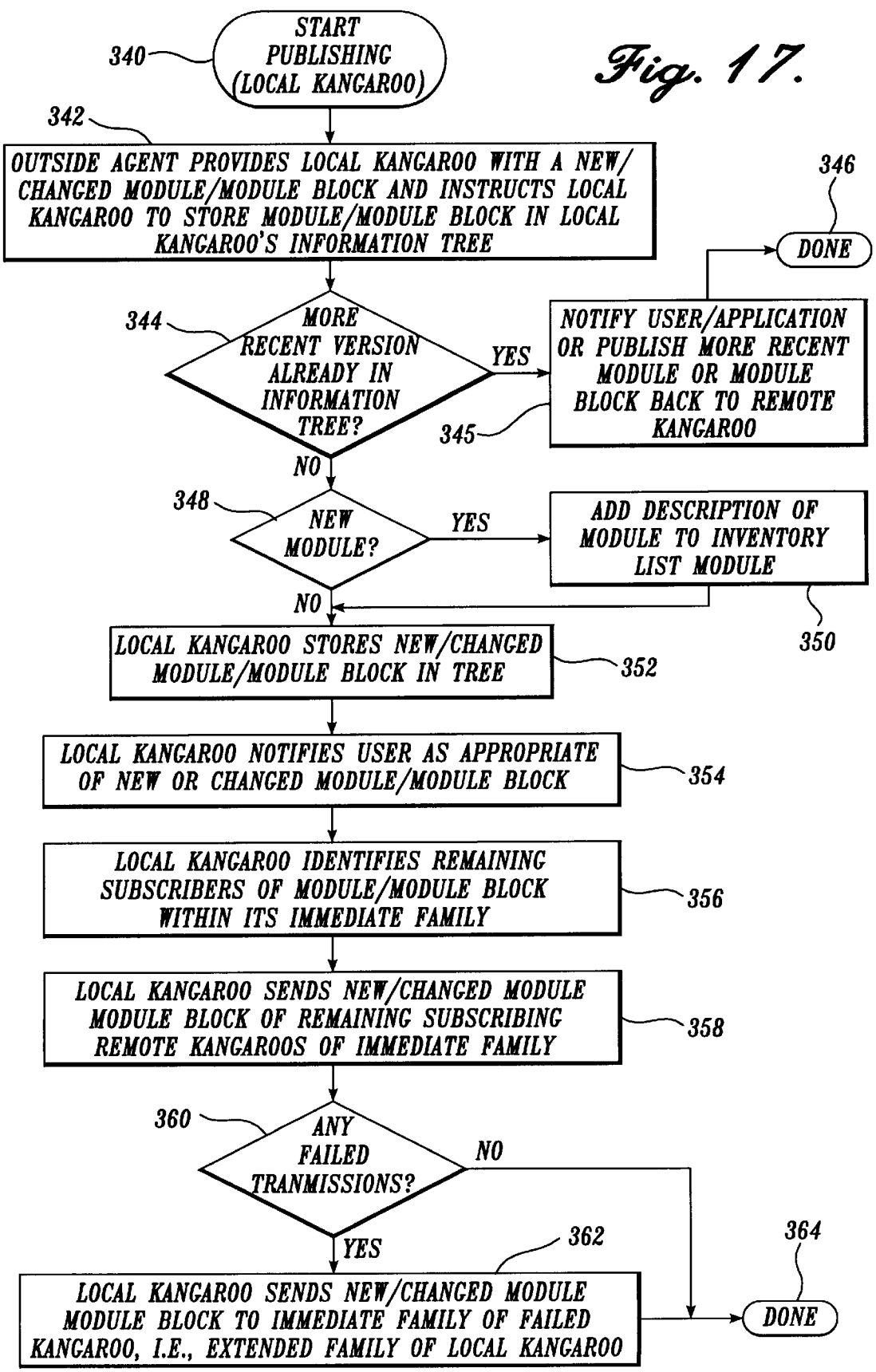
FIG. 17 is a flow chart illustrating the logic used to disseminate or publish information via a network structure organized into families of terminals.

The logic used by the publication module 40 of the present invention to distribute information is shown FIG. 17 from the perspective of a local Kangaroo originating the distribution. It will be appreciated that even though $K_1$ has been described herein as the "originating Kangaroo" or "local Kangaroo," each Kangaroo 15 of the network structure 24 installed with the information distribution program 36 can be an "originating Kangaroo" or "local Kangaroo" and thus distribute information as described herein. The publication of information is essentially the same as instructing a local Kangaroo to incorporate information into its information tree 46. This triggers the local Kangaroo to transmit the information to its nearest logical neighbors, i.e., its immediate family members. Accordingly, The logic in FIG. 17 begins in a block 340 and proceeds to a block 342 where an outside agent, i.e., a user of the local Kangaroo, an application installed on the local Kangaroo, or a remote Kangaroo in communication with the local Kangaroo, provides the local Kangaroo with a new or changed module 52 or module block 54 (and associated subscription list 48) and instructs the local Kangaroo to store the module 52 or module block 54 in its information tree 46. In a decision block 344, the local Kangaroo determines a more recent version of the module or module block is already in its information tree 46. In the case of a new module or module block, it will be appreciated that a corresponding module or module block will not be found in the information tree 46. In the case of a changed module or module block, the corresponding module or module block in the information tree 46 (i.e., the host module or module block as described above) is compared to the changed module or module block (i.e., the user module as described above) to determine if the information tree's module or module block is more recent than the changed module or module block.

Those of ordinary skill in the art will recognize that the determination of which module or module block is more recent can be made in a variety of ways, e.g., by comparing the contents of the changed module or module block to the contents of a corresponding module or module block in the information tree, by comparing version numbers of the module or module blocks, by comparing time stamps identifying the time of creation or update of the module or module block, by comparing fingerprints representing the contents of the module or module block, etc. In yet other embodiments of the present invention, some combination of the above methods is used, e.g., a comparison of version numbers and time stamps. In the actual embodiment of the present invention described herein, the version number of the changed module or module block is compared to the version number of the corresponding module or module block in the information tree 46. If the changed module or module block is not more recent than that already present in the information tree, there is no need to store or publish the changed module or module block provided in block 342 because the module or module block does not contain the most recent information available. However, there is a need to publish the more recent module or module block stored in the local Kangaroo's information tree 46 back to the remote Kangaroo who provided the changed module or module block because the remote Kangaroo obviously does not have available the most recent information.

Accordingly, the logic proceeds to a block 345 where the local Kangaroo publishes the more recent module or module block from its information tree 46 back to the remote Kangaroo from which it received the outdated module or module block. In turn, this remote Kangaroo publishes the more recent module or module block to its subscribing family members in accordance with the publication module 40. Consequently, the more recent module or module block of information is always guaranteed to be dynamically and automatically propagated throughout the network structure 24. Those of ordinary skill in the art will recognize that this aspect of the present invention provides for tolerance of slow, inefficient Kangaroos 15, which due to their connection or hardware limitations are unable to process information quickly and thus, attempt to publish outdated information, e.g., Kangaroos with remote connections to the network or Kangaroos with limited processing power such as cell phones or personal device assistants.

Finally, returning to block 342, it will be appreciated that if the changed module or module block is provided by the user or application of the local Kangaroo provided and the changed module or module block is not more recent than that already stored in the information tree 46 of the local Kangaroo (a scenario not likely to occur very often), there is no need to publish the more recent module or module block found in the local Kangaroo's information tree 46 back to any other Kangaroo. Instead, the user or application is simply notified of the more recent module or module block and the logic then ends in a block 346.

Returning to decision block 344, if the new or changed module 52 or module block 54 provided by the outside agent is more recent than that already stored in the information tree 46 of the local Kangaroo, the information tree 46 of the local Kangaroo must be updated with the new or changed module or module block. Consequently, the logic proceeds to a block 348 where it determines if the local Kangaroo has been provided an entirely new module of information. If so, a description of the new module 52 is added to the inventory of modules stored in local Kangaroo's information tree 46. As mentioned above, the inventory module is itself a module 52 stored in the local Kangaroo's information tree 46. Consequently, the description of the new module is added as a new module block to the inventory module and is automatically published to the immediate and extended family members of the local Kangaroo in accordance with the publication module 40. It will be appreciated that the inventory module will be published to each of the immediate family members of the local Kangaroo because each of the immediate family members automatically subscribes to the inventory module when it is added to the local Kangaroo's immediate family. As will be described below, each of the local Kangaroo's immediate family members will then pass on the inventory module to its immediate family members, i.e., the extended family members of the local Kangaroo, and so on.

Returning to decision block 348, if the module 52 provided by the outside agent is not a module, is not brand new, or is new and a description has been added to the local Kangaroo's inventory module, the local Kangaroo stores the new or changed module 52 or module block 54 in its information tree 46 in a block 352. If the provided module or module block is new it is merely added to the tree as a node (in the case of a module) or is added to the appropriate module (in the case of a module block). If the module or module block has been changed or updated, it replaces the corresponding module or module block in the information tree 46. In other words only the changed new or updated information is published by and stored in the information tree of a Kangaroo. Next, in a block 354, the local Kangaroo notifies the outside agent as appropriate of the new or changed module or module block. For example, a message may be displayed by the GUI 38 of the information distribution program 36. In other embodiments of the present invention, the outside agent is given the option of whether it wishes to receive and process the update.

After the new or changed module 52 or module block 54 is stored in the information tree 46, the local Kangaroo automatically publishes the new or changed module or module block (along with its associated subscription list 48) to its remaining (i.e., those other than the Kangaroo from which it received the module or module block) immediate family members who have previously subscribed to that module or module block. In this regard, the local Kangaroo identifies the remaining remote Kangaroos within its immediate family who have subscribed to the new or changed module or module block from the subscription list 48 associated with the module or module block in a block 356. As noted above and as will be described in more detail below, subscribers of the new or changed module or module block are those Kangaroos that have previously shown an interest in the module or module block. In a block 358, the local Kangaroo sends the new or changed module or module block to the remaining subscribing Kangaroos within the local Kangaroo's immediate family identified in block 356.

It will be appreciated from the above description that when the subscribing Kangaroos of the immediate family receive the new or changed module 52 or module block 54 of information published by the local Kangaroo, the logic of the publication module 40 will be repeated by each of those subscribing Kangaroos. Consequently, each subscribing Kangaroo will determine whether or not the received module or module block is more recent than that already stored in its information tree 46. If so, the subscribing Kangaroo stores the new or changed module or module block of information in its information tree and then publishes it to the subscribers of that module or module block within its own immediate family. If the received module or module block is not more recent than that already stored, the more recent module or module block found in the subscribing Kangaroo's information tree is published back to the remote Kangaroo having outdated information. In other words, the subscribing Kangaroo will publish or distribute the most recent module or module block to the subscribing extended family members of the originating local Kangaroo, or in some cases, back to the originating local Kangaroo. It follows that this publication process will be repeated for each immediate family and each level of extended family removed from the originating local Kangaroo. Hence, the most recent module or module block propagates virtually instantaneously throughout the network structure 24 back and forth between the immediate family members and the members of the extended family $n^{th}$ removed from the originating Kangaroos. However, the most recent module or module block of information will only be propagated to those members of the families who have previously subscribed to the information.

Those of ordinary skill in the art will further appreciate that the immediate and instantaneous propagation throughout the network structure 24 creates redundancy, i.e., immediate and extended family members may receive the new or changed module or module block more than once and/or from more than one source. However, upon receipt of the new or changed module or module block, the subscribing Kangaroo will always check to see if a more recent version of the module or module block is already within its information tree 46, and if it is, it will not be added or updated. In other words, each Kangaroo of the network structure 24 only stores and passes on the most recent information available. The multiple, nondedicated paths by which the modules and module blocks reach the interested Kangaroos provide for fault tolerance and increased bandwidth efficiency. Further, the ability to add Kangaroos to the this redundant, layered and overlapping family structure provides for immediate scalability of the entire information distribution system. Those of ordinary skill in the art will recognize, however, that ultimately, it may be necessary to limit the number of immediate families and/or levels of extended families to which information is published, due to inevitable limitations in bandwidth.

It will also be appreciated from the above discussion that the publication of new or changed module or module blocks of information is completely dynamic and bi-directional throughout the entire network of Kangaroos. More specifically, any Kangaroo connected to the network structure 24 can publish and subscribe to information making publication and subscription of modules or module blocks bi-directional between Kangaroos. As a specific example, a Kangaroo ($K_1$) installed with a word processing program such as Microsoft WORD® can publish an entire document as a new module 52 to an interested Kangaroo ($K_2$) as described above and as illustrated in FIG. 7. In the illustrated example, the document may comprise of the sentence "This module is part of a large collectshun." A user of $K_2$ may then modify the document by correcting the spelling of the word "collectshun" to "collection" and publish the updated module block 54 comprising the word "collection" back to $K_1$ (as well as other interested Kangaroos) as described above. In this case, $K_2$ would be the "local Kangaroo" implementing the publication module 40 logic shown in FIG. 17 and $K_1$ would be the subscribing Kangaroo. Users of $K_1$ and $K_2$ may then make further modifications to the document and publish those changes back and forth continually.

Returning to block 358, despite best efforts, publication to subscribing Kangaroos within the immediate family of the local Kangaroo may fail. The present invention tolerates such faults. In this regard, the logic proceeds from block 358 to a decision block 360 where the logic determines if there have been any failed transmissions to any of the subscribing Kangaroos in the local Kangaroo's immediate family. If not, the logic merely ends in a block 364. However, if transmission of a new or changed module 52 or module block 54 to a subscribing Kangaroo within the local Kangaroo's immediate family fails, the logic proceeds to a block 362 in which the local Kangaroo broadcasts the new or changed module or module block to the immediate family members of the failed subscribing Kangaroo (or Kangaroos) who are also subscribers of the new or changed module or module block. In other words, the local Kangaroo broadcasts the new or changed module or module block to members of its extended family that are related to the local Kangaroo through the failed subscribing Kangaroo. It is clear from the discussion above that the Kangaroos which receive the broadcast of the new or changed module or module block of information from the local Kangaroo will, in turn, publish the module or module block to its interested family members in accordance with the publication module 40 shown in FIG. 17. In other words, the module or module block will continue to propagate through the immediate and extended families of the originating local Kangaroo despite the failure of one of its immediate or extended family members.

The Subscription Module

Figure 18:
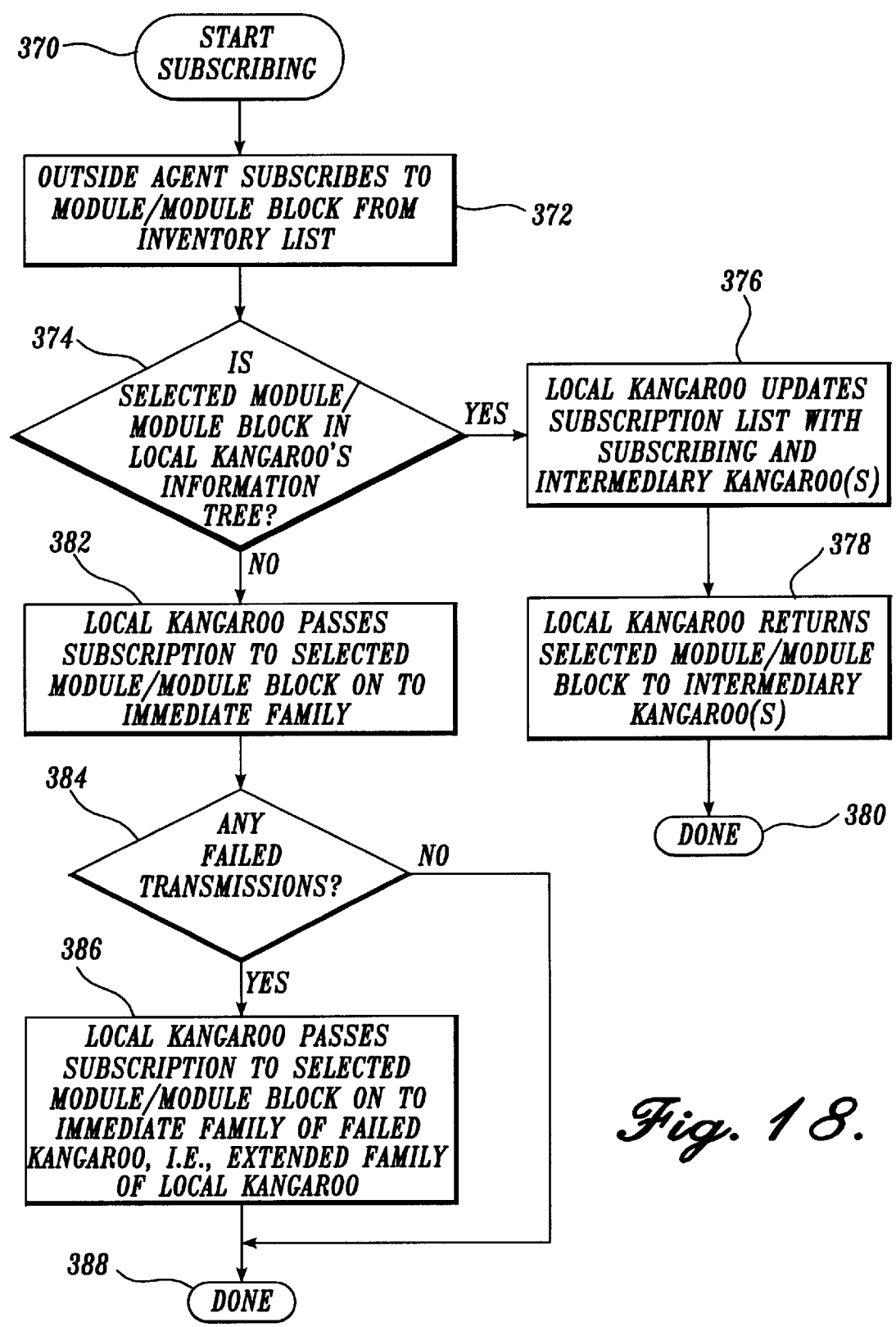
FIG. 18 is a flow chart illustrating the logic used to subscribe to or show interest in particular information available from the terminals comprising the network structure.

Now that the publication module 40 has been described in more detail, the subscription module 42 will be discussed. As mentioned above, in one actual embodiment of the present invention, a new or updated module 52 or module block 54 will only be distributed or published to those Kangaroos 15 connected to the network structure 24 which have previously shown an interest in or subscribed to the module or module block. The logic for the subscription module 42 is shown in FIG. 18 and begins in a block 370. In a block 372, an outside agent, i.e., a user of the local Kangaroo, an application installed on the local Kangaroo, or a remote Kangaroo, subscribes to a module or module block from an inventory list as stored in the inventory module of the local Kangaroo's information tree 46. If the outside agent is a user of the local Kangaroo, the user subscribes by selecting the desired module or module block from an inventory list displayed by the GUI 38 of the information distribution program 36. If the outside agent is an application installed on a local Kangaroo, the application subscribes to the desired module or module block from an inventory list made available to the application in memory of the local Kangaroo as appropriate. If the outside agent is a remote Kangaroo, it will be recognized that the remote Kangaroo is passing on a subscription made by a user or application of the remote Kangaroo or another Kangaroo that could not be fulfilled by the remote Kangaroo itself.

In a decision block 374, the local Kangaroo determines if the desired module 52 or module block 54 is in its own information tree 46. If so, the local Kangaroo can process the subscription itself. If not, the local Kangaroo must pass on the subscription to its immediate family members in a block 382 in an effort to find its nearest family members with the desired module or module block. It will be appreciated that upon receipt of the subscription, each of the immediate family members subscribe to the desired module or module block in accordance with the subscription module 42. Hence, each immediate family member looks for the desired module or module block in its information tree, and if found, process the subscription itself. If not found, the Kangaroo passes the subscription on to its immediate family members and so on. It will be appreciated from this discussion that the subscription may be passed on a number of times before a Kangaroo is found having the desired module or module block.

Returning to decision block 374, if the desired module 52 or module block 54 is finally found in the local Kangaroo's information tree 46, the local Kangaroo updates the subscription list 48 for the desired module with the name and network address of the original subscribing Kangaroo and any intermediary Kangaroos in a block 376. It will be appreciated that if the user or application of the local Kangaroo subscribed to the module or module block, the subscribing Kangaroo is the local Kangaroo and no intermediary Kangaroos are present. However, if the local Kangaroo received the subscription from a remote Kangaroo, the subscribing Kangaroo is the original remote Kangaroo whose user or application subscribed to the module or module block. The intermediary Kangaroos are the local Kangaroo and those remote Kangaroos who were unable to process the subscription and thus, passed on the subscription.

After the subscription list 48 for the desired module 52 or module block 54 is updated in the local Kangaroo's information tree 46, the local Kangaroo returns the desired module or module block to the original subscribing Kangaroo and each of the intermediary Kangaroos in a block 378. The logic then ends in a block 380. Those of ordinary skill in the art will recognize that if the original subscribing Kangaroo is the local Kangaroo, there is no need to "return" the module or module block. Further, it will be appreciated that when the subscribing Kangaroo and each of the intermediary Kangaroos (who in effect are also subscribing Kangaroos) receive the selected module of module block, each of the Kangaroos will publish the module or module block as appropriate in accordance with the publication module 40.

As with publication, it is possible that faults may occur when transmitting information to other Kangaroos. Consequently, in a decision block 384, the logic determines if there have been any failed transmissions of the subscription made by the outside agent to any of the immediate family members of the local Kangaroo. If not, the logic merely ends in a block 388. However, if transmission of the subscription fails to any of the immediate family members, the logic proceeds to a block 386 where the local Kangaroo broadcasts the subscription for the desired module 52 or module block 54 to the immediate family members of the failed Kangaroo, i.e., the extended family members of the local Kangaroo that are related to it through the failed Kangaroo. It is clear from this discussion that each extended family member of the local Kangaroo will, in turn, subscribe to the desired module or module block and return the desired module or module block, if available in its information tree 46; or pass on the subscription to its immediate family members, if the module or module block is not available. In other words, the subscription will continue to propagate through the immediate and extended families of the original subscribing Kangaroo until the desired module or module block is found and returned to the original and intermediary subscribing Kangaroos.

It will be further appreciated from this description that more than one Kangaroo may receive the subscription and return the desired module or module block. However, upon receipt of the desired module or module block, the subscribing Kangaroo processes the module or module block in accordance with the publication module 40. Therefore, the subscribing Kangaroo determines if the module or module block is more recent than that already stored in its information tree 46. If it is not, the subscribing Kangaroo simply does not process it no matter how many times it receives that version of the module of module block. In other words, the subscribing Kangaroo merely process and publishes the desired module or module block the first time the Kangaroo receives it.

While the preferred embodiment of the invention has been illustrated and described, it will be appreciated that various changes can be made therein without departing from the spirit and scope of the invention. For example, instead of storing an inventory list in an inventory module that is updated automatically, each Kangaroo 15 may periodically retrieve a description of all modules and module blocks available from all immediate and extended family members known to it and produce an amalgamated view of all the information available on those Kangaroos. In another embodiment of the present invention, a local subscription list is maintained rather than distributed subscriptions lists 48 associated with each module 52 or module block 54 in an information tree 46. The local subscription list itself is a module in the information tree 46 containing the name and network address of each subscribing Kangaroo within the immediate family of the local Kangaroo and a description of the module(s) or module block(s) to which each of those Kangaroos has subscribed. Further, the local subscription list is subscribed to, published and updated as any other module or module block. As yet another aspect of the present invention, the information trees 46 of each Kangaroo is purged periodically of module or modules blocks that have been retained, but not subscribed to by any members of the immediate family. Finally, it will be appreciated that the information distribution program 36 of the present invention may be used to distribute any type of information, regardless of the application, platform or environment from which or on which it is generated, across any interconnection of processors and memory devices, creating a truly dynamic, interdependent, yet fault tolerant system.

The embodiments of the invention in which an exclusive property or privilege is claimed are defined as follows:

1. Apparatus, included in each of a plurality of devices communicating with one another via a common communication medium, for distributing a module block of information stored in a storage medium of at least one of the plurality of devices, the apparatus comprising:
   (a) storage medium for storing program instructions for distributing the module block of information;
   (b) an interface for communicating via the communication medium;
   (c) a processing unit electronically coupled to the storage medium and the interface for executing program instructions that cause the module block of information to be distributed by:
      (i) receiving a module block of information from an outside agent;
      (ii) determining if the module block of information received from the outside agent is more recent than a corresponding module block of information stored in the storage medium of the device; and
      (iii) transmitting the module block of information to an immediate family of devices directly related to the device and connected to the communication medium, wherein the immediate family of devices is a subset of the plurality of devices connected to the communication medium, if the module block of information received from the outside agent is more recent than the corresponding module block of information store in the storage medium.

2. The apparatus of claim 1, wherein the program instructions executed by the processing unit further cause the module block to be distributed by storing the module block of information received from the outside agent in the storage medium of the device, if the module block received from the outside agent is more recent than the corresponding module block of information stored in the storage medium of the device.

3. The apparatus of claim 2, wherein the program instructions executed by the processing unit further cause the module block to be distributed by returning the corresponding module block of information stored in the storage medium of the device to the outside agent, if the corresponding module block of information stored in the storage medium of the device is more recent than the module block of information received from the outside agent.

4. The apparatus of claim 3, wherein the module block of information is transmitted to the devices within the immediate family of devices which have previously shown an interest in the module block of information.

5. The apparatus of claim 4, wherein the processing unit further executes program instructions that cause the device to show interest in a desired module of information by:
   (a) receiving a show of interest in the desired module of information from an outside agent; and
   (b) if the module of information is stored in the storage medium of the device:
      (i) adding the identity of the device and any intermediary devices who have received the show of interest in the desired module of information, to a list of devices interested in the desired module of information; and
      (ii) returning the desired module to the outside agent.

6. The apparatus of claim 5, wherein if the module of information is not stored in the storage medium of the device, the show of interest is transmitted to the immediate family of the device.

7. The apparatus of claim 6, wherein if any of the devices in the immediate family of devices fails to process the show of interest in information transmitted by the device, the processing unit executes program instructions that cause the device to transmit the show of interest to an immediate family of devices directly related to the failed device.

8. The apparatus of claim 3, wherein a plurality of modules and module blocks of information are organized into an information hierarchy stored in the storage medium of the device.

9. The apparatus of claim 8, wherein determining if the module block of information received from the outside agent is more recent than the corresponding module block of information stored in the storage medium of the device comprises comparing the module block of information received from the outside agent to a corresponding module block of information in the information hierarchy to determine which module block of information is more recent.

10. The apparatus of claim 9, wherein storing the module block of information received from the outside agent in the storage medium of the device comprises replacing the corresponding module block in the information hierarchy with the module block received from the outside agent, if the module block received from the outside agent is more recent than the corresponding module block of information.

11. The apparatus of claim 8, wherein storing the module block of information received from the outside agent in the storage medium of the device comprises adding the module block received from the outside agent to the information hierarchy, if a corresponding module block information is not present in the information hierarchy.

12. The apparatus of claim 3, wherein if any of the devices in the immediate family of devices fails to process the module block of information transmitted by the device, the processing unit executes program instructions that cause the device to transmit the module block of information to an immediate family of devices directly related to the failed device.

13. The apparatus of claim 3, wherein the module block can be at least one of a plurality of module blocks comprising a module of information; and wherein the module block can be a module of information containing a plurality of other module blocks of information.

14. The apparatus of claim 1, wherein the processing unit further executes program instructions that cause the device to identify the immediate family to which the device transmits the module of information by:
   (a) receiving a request from another device connected to the communication medium to be adopted into the immediate family of the device; and
   (b) adding the requesting device to the immediate family of the device, if a maximum capacity for the immediate family has not been reached.

15. The apparatus of claim 14, wherein the program instructions executed by the processing unit further cause the device to identify the immediate family by transmitting the request for adoption from the other device to the devices in the immediate family of the device, if a maximum family capacity has been reached.

16. The apparatus of claim 15, wherein the program instructions executed by the processing unit further cause the device to request adoption by:
   (a) sending a request to be adopted to the other device via the communication medium;
   (b) receiving a response from a device capable of adopting the requesting device; and
   (c) adding the devices in the immediate family of the adopting device to the immediate family of the requesting device.

17. A method for distributing information stored in modules to a plurality of devices coupled to a communication medium, wherein each device includes a processing unit and a memory, the method comprising:
   (a) receiving a module of information from an outside agent;
   (b) determining if the module of information received from the outside agent is more recent than a corresponding module of information stored in the memory of the device; and
   (c) transmitting the module of information to an immediate family of devices directly related to the device and coupled to the communication medium, wherein the immediate family of devices is a subset of the plurality of devices connected to the communication medium, if the module of information received from the outside agent is more recent than the corresponding module of information stored in the memory.

18. The method of claim 17, further comprising storing the module of information received from the outside agent in the memory of the device, if the module received from the outside agent is more recent than the corresponding module of information stored in the memory of the device.

19. The method of claim 18, further comprising returning the corresponding module of information stored in the memory of the device to the outside agent, if the corresponding module of information stored in the memory of the device is more recent than the module of information received from the outside agent.

20. The method of claim 19, wherein a plurality of modules of information are organized into an information hierarchy stored in the memory of the device.

21. The method of claim 20, wherein determining if the module of information received from the outside agent is more recent than the corresponding module of information stored in the memory of the device comprises comparing the module of information received from the outside agent to a corresponding module of information in the information hierarchy to determine which module of information is more recent.

22. The method of claim 21, wherein storing the module of information received from the outside agent in the memory of the device comprises replacing the corresponding module in the information hierarchy with the module received from the outside agent, if the module received from the outside agent is more recent than the corresponding module of information.

23. The method of claim 22, wherein storing the module of information received from the outside agent in the memory of the device comprises adding the module received from the outside agent to the information hierarchy, if a corresponding module information is not present in the information hierarchy.

24. The method of claim 23, wherein the module is at least one of a plurality of module blocks comprising a another module of information.

25. The method of claim 23, wherein the module comprises a plurality of module blocks of information.

26. The method of claim 17, wherein the module of information is transmitted to the devices within the immediate family of devices which have previously shown an interest in the module of information.

27. The method of claim 26, further comprising showing interest in a desired module of information by:
   (a) receiving a show of interest in the desired module of information from an outside agent; and
   (b) if the module of information is stored in the memory of the device:
      (i) adding the identity of the device and any intermediary devices who have received the show of interest in the desired module of information, to a list of devices interested in the desired module of information; and
      (ii) returning the desired module to the outside agent.

28. The method of claim 27, wherein if the module of information is not stored in the memory of the device, the show of interest is transmitted to the immediate family of the device.

29. The method of claim 28, wherein if any of the devices in the immediate family of devices fails to process the show of interest in information transmitted by the device, the show of interest is transmitted to an immediate family of devices directly related to the failed device.

30. The method of claim 27, wherein the outside agents makes the show of interest in information by selecting the information from an inventory of information available from the plurality of devices coupled to the communication medium.

31. The method of claim 30, wherein the inventory of information comprises a module of information.

32. The method of claim 17, further comprising identifying the immediate family to which the device transmits the module of information by:
   (a) receiving a request from another device coupled to the communication medium to be adopted into the immediate family of the device; and
   (b) adding the requesting device to the immediate family of the device, if a maximum capacity for the immediate family has not been reached.

33. The method of claim 32, wherein identifying the immediate family to which the device transmits the module of information further comprises transmitting the request for adoption from the other device to the devices in the immediate family of the device, if a maximum family capacity has been reached.

34. The method of claim 33, further comprising requesting adoption into the immediate family of another device by:
   (a) sending a request to be adopted via the communication medium;
   (b) receiving a response from a device capable of adopting the requesting device; and
   (c) adding the devices in the immediate family of the adopting device to the immediate family of the requesting device.

35. The method of claim 17, wherein if any of the devices in the immediate family of devices fails to process the module block of information transmitted by the device, the module block of information is transmitted to an immediate family of devices directly related to the failed device.

* * * * *

UNITED STATES PATENT AND TRADEMARK OFFICE
CERTIFICATE OF CORRECTION

PATENT NO.   : 6,240,451 B1
DATED        : May 29, 2001
INVENTOR(S)  : R.D.L. Campbell et al.

It is certified that error appears in the above-identified patent and that said Letters Patent is hereby corrected as shown below:

Item [56], References Cited, U.S. PATENT DOCUMENTS, insert in appropriate order the following:

| | | |
|---|---|---|
| -- 5,404,488 | 4/1995  | Kerrigan et al. |
| 4,897,782    | 1/1990  | Bennett et al. |
| 4,928,225    | 5/1990  | McCarthy et al. |
| 5,029,070    | 7/1991  | McCarthy et al. |
| 5,043,886    | 8/1991  | Witek et al. |
| 5,113,514    | 5/1992  | Albonesi et al. |
| 5,119,485    | 6/1992  | Ledbetter, Jr. et al. |
| 4,796,293    | 1/1989  | Blinken et al. |
| 5,495,610    | 2/1996  | Shing et al. |
| 5,388,255    | 2/1995  | Pytlik et al. |
| 4,558,413    | 12/1985 | Schmidt et al. |
| 5,493,607    | 2/1996  | Arumainayagam et al. |
| 5,504,888    | 4/1996  | Iwamoto et al. |
| 5,499,371    | 3/1996  | Henninger et al. |
| 5,497,491    | 3/1996  | Mitchell et al. |
| 5,511,208    | 4/1996  | Boyles et al. |
| 5,485,609    | 1/1996  | Vitter et al. |
| 5,187,787    | 2/1993  | Skeen et al. |
| 5,527,369    | 10/1993 | Skeen et al. |
| 5,557,798    | 9/1996  | Skeen et al. |
| 5,581,764    | 12/1996 | Fitzgerald et al. -- |

Insert in appropriate order the following:
-- 5,261,094   11/1993   Everson et al. --

Insert in appropriate order the following:
| | | |
|---|---|---|
| -- 4,710,870 | 12/1987 | Blackwell et al. |
| 5,155,847    | 10/1992 | Kirouac et al. |
| 5,408,619    | 4/1995  | Oran -- |

UNITED STATES PATENT AND TRADEMARK OFFICE
CERTIFICATE OF CORRECTION

PATENT NO.   : 6,240,451 B1
DATED        : May 29, 2001
INVENTOR(S)  : R.D.L. Campbell et al.

It is certified that error appears in the above-identified patent and that said Letters Patent is hereby corrected as shown below:

Item [56], References Cited, FOREIGN PATENT DOCUMENTS, insert in appropriate order the following:

-- FOREIGN PATENT DOCUMENTS
0 127 753    12/19/84    (EU) --

Insert in appropriate order the following:
-- 0 284 924    10/1988    (EP)
0 586 157    3/1994    (EP) --

Insert in appropriate order the following:
-- WO 96/23267    8/1996    (PCT) --

Item [56], References Cited, OTHER PUBLICATIONS, insert in appropriate order the following:

-- OTHER PUBLICATIONS
Laura Lemay, *Official Marimba™ Guide to Castanet*, Sams.net Publishing, 1997, Chapters 1 (pp. 3-16), 3 (pp. 31-64), 7 (pp. 131-144) and 11 (pp 221-246).

Oil Change Online User's Manual, www.oilchange.cybermedia.com, believed to be published at least as early as September 5, 1997. --

Insert in appropriate order the following:
-- IBM Technical Disclosure Bulletin, May 1993, US, "Hash Index for Locating Tuples in a Distributed or Parallel Database."

"The Art of Computer Programming," Vol. 3, "Sorting and Searching" by Knuth, D.E., pp. 99-102: 506-514. --

Insert in appropriate order the following:
-- Supplementary European Search Report in Application No. EP 96 92 0411 dated Mar. 5, 1999. --

Insert in appropriate order the following:
-- *Les Serveurs Push*, PC Expert, No. 64, pp. 187-190, Sept. 1997 (with translation).

UNITED STATES PATENT AND TRADEMARK OFFICE
CERTIFICATE OF CORRECTION

PATENT NO. : 6,240,451 B1
DATED : May 29, 2001
INVENTOR(S) : R.D.L. Campbell et al.

It is certified that error appears in the above-identified patent and that said Letters Patent is hereby corrected as shown below:

Column 37,
Line 19, "(a) storage" should read -- (a) a storage --
Line 22, "medium;" should read -- medium; and --
Line 42, "mation store in" should read -- mation stored in --

Column 38,
Line 4, "who" should read -- which --
Line 42, "block information" should read -- block of information --

Column 39,
Line 63, "module information" should read -- module of information --
Line 66, "a another" should read -- another --

Column 40,
Line 14, "who" should read -- which --
Line 29, "outside agents" should read -- outside agent --

Signed and Sealed this

Tenth Day of September, 2002

Attest:

JAMES E. ROGAN
Attesting Officer
Director of the United States Patent and Trademark Office